(12) United States Patent
Zhu

(10) Patent No.: US 10,760,296 B2
(45) Date of Patent: Sep. 1, 2020

(54) HARDTOP GAZEBO AND A PROCESS USED IN THE MAKING THEREOF

(71) Applicant: Sunjoy Industries Group Ltd., Steubenville, OH (US)

(72) Inventor: Qi Zhu, Jiaxing (CN)

(73) Assignee: Sunjoy Industries Group Ltd., Steubenville, OH (US)

( * ) Notice: Subject to any disclaimer, the term of this patent is extended or adjusted under 35 U.S.C. 154(b) by 0 days.

(21) Appl. No.: 16/212,512

(22) Filed: Dec. 6, 2018

(65) Prior Publication Data

US 2020/0181936 A1 Jun. 11, 2020

(51) Int. Cl.

| E04H 15/18 | (2006.01) |
|---|---|
| E04H 15/34 | (2006.01) |
| B41F 16/00 | (2006.01) |
| B29C 51/42 | (2006.01) |
| B29C 51/10 | (2006.01) |
| B29C 51/16 | (2006.01) |
| A47C 7/66 | (2006.01) |
| B29C 51/00 | (2006.01) |

(52) U.S. Cl.
CPC .............. *E04H 15/18* (2013.01); *A47C 7/66* (2013.01); *B29C 51/00* (2013.01); *B29C 51/10* (2013.01); *B29C 51/165* (2013.01); *B29C 51/421* (2013.01); *B41F 16/0046* (2013.01); *B41F 16/0073* (2013.01); *E04H 15/34* (2013.01)

(58) Field of Classification Search
CPC ....... B29C 51/00; B29C 51/10; B29C 51/421; B29C 51/165; A47C 7/66; E04H 15/18; E04H 15/34; B41F 16/0073; B41F 16/0046

USPC .................................................. 156/277, 285
See application file for complete search history.

(56) References Cited

U.S. PATENT DOCUMENTS

| 5,114,789 | A | * | 5/1992 | Reafler | B01F 17/0057 |
|---|---|---|---|---|---|
|  |  |  |  |  | 428/328 |
| 9,243,422 | B2 |  | 1/2016 | Hunt et al. |  |
| 9,556,639 | B2 |  | 1/2017 | Hunt et al. |  |
| 10,132,075 | B2 |  | 11/2018 | Banal et al. |  |
| 10,184,264 | B2 |  | 1/2019 | Hunt et al. |  |

(Continued)

FOREIGN PATENT DOCUMENTS

| GB | 2421473 A | * | 6/2006 | ......... A47L 15/4265 |
|---|---|---|---|---|
| JP | 52152473 A | * | 12/1977 |  |
| JP | 07051112 A | * | 2/1995 |  |

*Primary Examiner* — Sonya M Sengupta
(74) *Attorney, Agent, or Firm* — The Law Office of Patrick F. O'Reilly, III, LLC

(57) ABSTRACT

A hardtop gazebo and a process used in the making of the hardtop gazebo are disclosed herein. The hardtop gazebo includes a plurality of corner support members; a plurality of crossbeam members, at least some of the crossbeam members configured to be connected between a pair of the plurality of corner support members; a plurality of roof frame members, at least some of the roof frame members configured to be circumferentially spaced apart from one another so as to form a supporting structure for a roof of the hardtop gazebo; and a plurality of connecting members. The process used in the making of the hardtop gazebo includes applying a heat transfer paper with a particular print pattern to primed outer surfaces of one or more components of the hardtop gazebo.

8 Claims, 16 Drawing Sheets

(56) References Cited

U.S. PATENT DOCUMENTS 10,202,783 B2 2/2019 Pan
10,214,938 B2 2/2019 Pan

* cited by examiner

Detail "A"

Detail "B"

Detail "C"

Detail "D"

Detail "E"

Detail "F"

Detail "G"

Detail "H"

HARDTOP GAZEBO AND A PROCESS USED IN THE MAKING THEREOF

CROSS-REFERENCE TO RELATED APPLICATIONS

Not Applicable.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a hardtop gazebo and a process used in the making thereof. More particularly, the invention relates to a structure of a hardtop gazebo and a heat transfer film process used in making one or more components of the hardtop gazebo.

2. Background

Portable shelters, such as outdoor gazebos, are useful for a myriad of different applications. For example, portable gazebos are often used for outdoor parties, such as backyard cookouts or tailgate parties at various sporting events. Because the portable gazebos are at least partially enclosed, a food serving table or tables are often placed inside of the gazebo to protect the food being served at the event from sunlight, rain, and/or insects. Also, dining tables may be arranged underneath the portable gazebo so that attendees at the party may remain cooler by being shaded from direct sunlight.

Although, the structural components used in conventional portable shelters are often limited in both their functionality and desired appearance. For example, the appearance of the components used to form conventional portable shelters are typically limited by the material finish of the base substrate forming the components.

Therefore, what is needed is a hardtop gazebo that has enhanced functionality, such as air venting from the interior of the hardtop gazebo. In addition, a heat transfer film process is needed for the making of a hardtop gazebo so that one or more components thereof may be provided with an exterior finish that is not limited by the base substrate used for the one or more components of the hardtop gazebo.

BRIEF SUMMARY OF EMBODIMENTS OF THE INVENTION

Accordingly, the present invention is directed to a hardtop gazebo and a process used in the making thereof that substantially obviates one or more problems resulting from the limitations and deficiencies of the related art.

In accordance with one or more embodiments of the present invention, there is provided a hardtop gazebo that includes a plurality of corner support members; a plurality of crossbeam members, at least some of the crossbeam members configured to be connected between a pair of the plurality of corner support members; a plurality of roof frame members, at least some of the roof frame members configured to be circumferentially spaced apart from one another so as to form a supporting structure for a roof of the hardtop gazebo; and a plurality of connecting members, a first set of the plurality of connecting members configured to couple respective ones of the plurality of roof frame members to respective ones of the plurality of corner support members, and a second set of the plurality of connecting members configured to couple respective ones of the plurality of roof frame members to respective ones of the plurality of crossbeam members.

In a further embodiment of the present invention, at least some of the plurality of connecting members includes a base portion connected to an elevated tray portion, the base portion configured to be coupled to a respective one of the plurality of corner support members or one or more of the plurality of crossbeam members, and the elevated tray portion configured to be coupled to a respective one of the plurality of roof frame members.

In yet a further embodiment, the roof of the hardtop gazebo comprises a large peripheral roof portion and a small central roof portion.

In still a further embodiment, a roof vent is defined between the large peripheral roof portion and the small central roof portion.

In yet a further embodiment, the roof vent is defined by a plurality of roof vent wall members, at least one of the roof vent wall members comprising one or more apertures formed therein.

In still a further embodiment, the large peripheral roof portion comprises a plurality of overlapping ribbed roof panels.

In yet a further embodiment, the hardtop gazebo further comprises at least one diagonal support member configured to be attached between a respective one of the plurality of corner support members and a respective one of the plurality of crossbeam members.

In still a further embodiment, the plurality of roof frame members includes a plurality of concentrically arranged subsets of horizontal roof frame members.

In yet a further embodiment, at least some of the horizontal roof frame members comprise diagonally oriented flange members located at oppositely disposed longitudinal ends of the horizontal roof frame members.

In still a further embodiment, the plurality of roof frame members includes at least one pair of diagonally oriented roof frame members extending to respective corners of the roof of the hardtop gazebo, and wherein the plurality of roof frame members further includes one or more middle roof frame members disposed between the at least one pair of diagonally oriented roof frame members.

In yet a further embodiment, each of the diagonally oriented roof frame members comprises a first end and a second end oppositely disposed relative to the first end, a first end of each of the diagonally oriented roof frame members configured to be coupled to one of the corner support members, and a second end of each of the diagonally oriented roof frame members configured to be coupled to an end portion of a roof vent wall member.

In still a further embodiment, each of the one or more middle roof frame members comprises a first end and a second end oppositely disposed relative to the first end, a first end of each of the one or more middle roof frame members configured to be coupled to one of the crossbeam members, and a second end of each of the middle roof frame members configured to be coupled to a middle portion of a roof vent wall member.

In accordance with one or more other embodiments of the present invention, there is provided a process used in making a hardtop gazebo. The process includes the steps of: (i) applying a primer coat to an outer surface of a component of the hardtop gazebo; (ii) applying a heat transfer paper with a print pattern to the primed outer surface of the component of the hardtop gazebo; (iii) inserting the component of the hardtop gazebo with the heat transfer paper applied thereto into a sleeve having an open end; (iv) attaching a vacuum source to the open end of the sleeve; (v) extracting the air from inside the sleeve using the vacuum source so as to cause the sleeve to shrink and wrap tightly around the component of the hardtop gazebo with the heat transfer paper applied thereto; (vi) placing the component of the hardtop gazebo with the heat transfer paper and the vacuum wrapped sleeve into an oven; (vii) heating the component of the hardtop gazebo with the heat transfer paper and the vacuum wrapped sleeve inside the oven within a predetermined temperature range for a predetermined time duration; (viii) removing the component of the hardtop gazebo with the heat transfer paper and the vacuum wrapped sleeve from the oven so as to allow the component of the hardtop gazebo with the heat transfer paper and the vacuum wrapped sleeve to cool; and (ix) removing the vacuum wrapped sleeve from the component of the hardtop gazebo with the heat transfer paper, thereby resulting in a finished product.

In a further embodiment of the present invention, the component of the hardtop gazebo to which the primer coat is applied comprises a corner post member, and wherein the print pattern of the heat transfer paper comprises a wood grain pattern.

In yet a further embodiment, the primer coat is applied to the component of the hardtop gazebo using an electrostatic spray gun.

In still a further embodiment, the primer coat is applied to the component of the hardtop gazebo so as to have a film thickness between approximately 50 microns and approximately 80 microns.

In yet a further embodiment, the process further comprises the steps of: (x) prior to applying the heat transfer paper to the primed outer surface of the component of the hardtop gazebo, heating the primed outer surface of the component of the hardtop gazebo to a temperature of approximately 200 degrees Celsius for a time duration of approximately 30 minutes so as to cure the primed outer surface of the component of the hardtop gazebo; and (xi) allowing the component of the hardtop gazebo to cool prior to the step of applying the heat transfer paper to the primed outer surface of the component of the hardtop gazebo.

In still a further embodiment, the heat transfer paper comprises a paper substrate that is coated with wax and color pigments.

In yet a further embodiment, the predetermined temperature range for heating the component of the hardtop gazebo with the heat transfer paper and the vacuum wrapped sleeve inside the oven is between approximately 180 degrees Celsius and approximately 200 degrees Celsius.

In still a further embodiment, the predetermined time duration for heating the component of the hardtop gazebo with the heat transfer paper and the vacuum wrapped sleeve inside the oven is between approximately 15 minutes and approximately 20 minutes.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 1:
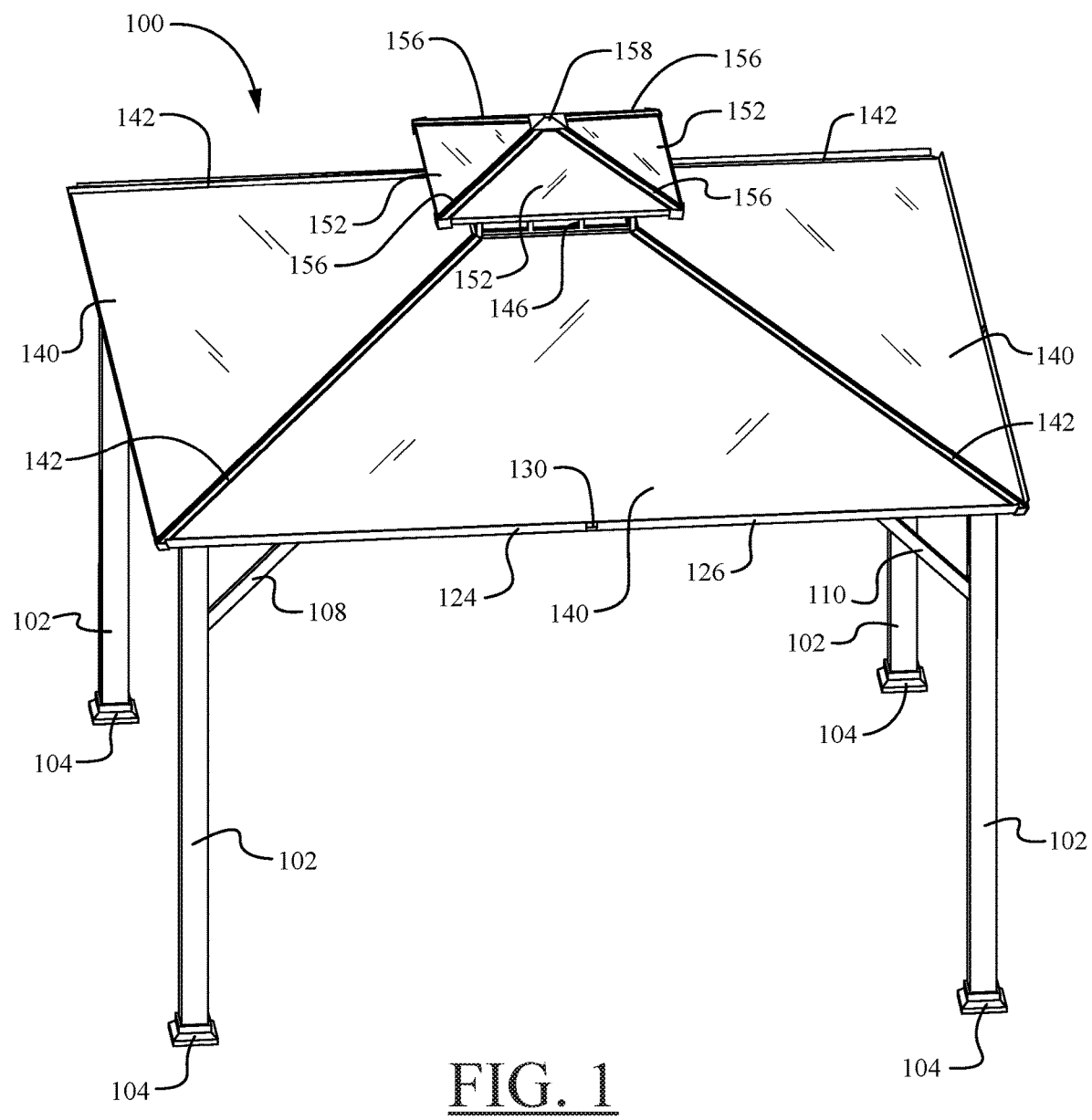
FIG. 1 is a front-top perspective view of a hardtop gazebo, according to a first illustrative embodiment of the invention.

A first illustrative embodiment of the hardtop gazebo is seen generally at 100 in FIGS. 1-9. Initially, referring primarily to the assembled perspective view of FIG. 1 and the exploded perspective view of FIG. 2, it can be seen that the hardtop gazebo 100 generally comprises a plurality of corner support members (e.g., four (4) corner support posts 102); a plurality of crossbeam members 112, 114, the crossbeam members 112, 114 configured to be connected between a pair of the plurality of corner support members 102; a plurality of roof frame members 124, 126, 128, 130, 132, 134, 136, 138, at least some of the roof frame members 124, 126, 128, 130, 132, 134, 136, 138 configured to be circumferentially spaced apart from one another so as to form a supporting structure for a roof of the hardtop gazebo 100; and a plurality of connecting members 117, 118, a first set of the plurality of connecting members 117 configured to couple respective ones of the plurality of roof frame members 128 to respective ones of the plurality of corner support members 102, and a second set of the plurality of connecting members 118 configured to couple respective ones of the plurality of roof frame members 130 to respective ones of the plurality of crossbeam members 112, 114.

As shown in FIGS. 1-6, the corner support members of the hardtop gazebo 100 of the first illustrative embodiment are in the form of corner post members 102. With reference to the exploded view of FIG. 2, it can be seen that each of the corner support post members 102 is provided with a respective base plate member 106 and a post base cover 104 to conceal each base plate member 106.

Now, with reference to FIGS. 2-6, the crossbeam members 112, 114 of the hardtop gazebo 100 will be described in detail. As best shown in the exploded perspective view of FIG. 2, each of the four sides of the hardtop gazebo 100 includes a pair of crossbeam members 112, 114. The inner ends of each crossbeam member 112, 114 are joined together by means of a central connection sleeve (see FIG. 2). In the illustrative embodiment, the corners formed by the joined outer ends of paired of crossbeam members 112, 114 are received within notches formed in the interior corners of each of the post members 102 (see FIG. 2). Then, inside corner cover members 107 are used to secure the joined outer ends of the crossbeam members 112, 114 together.

Figure 8:
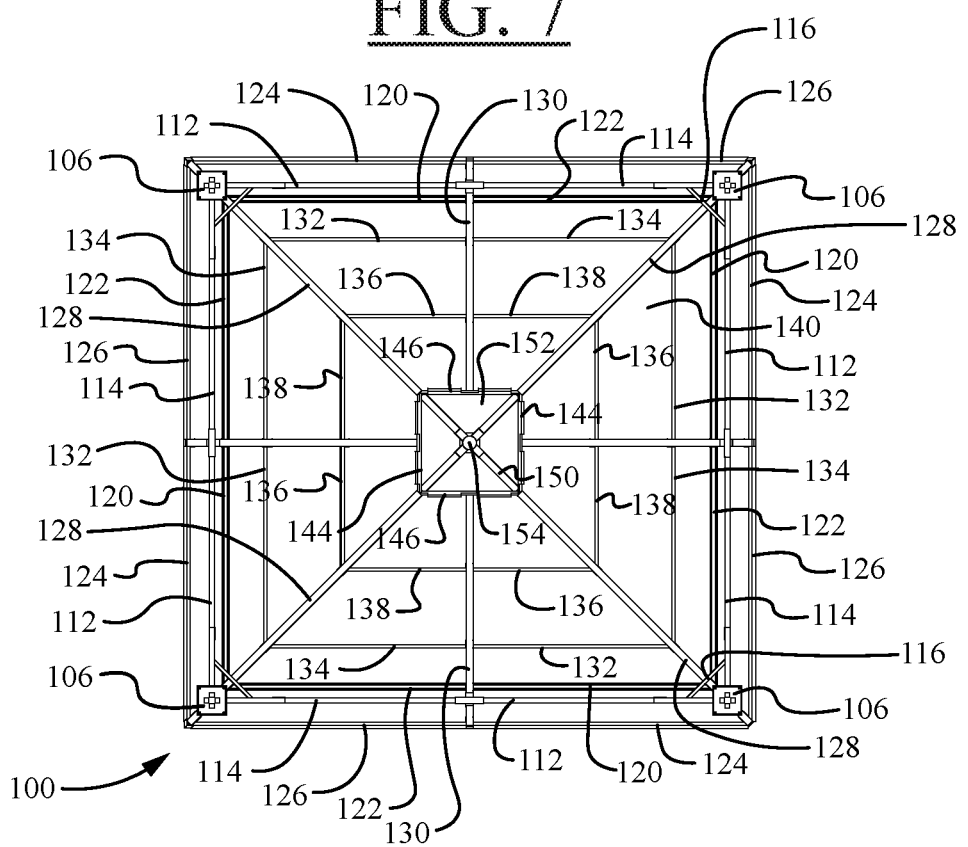
FIG. 8 is a bottom plan view of the hardtop gazebo of FIG. 1.
Figure 9:
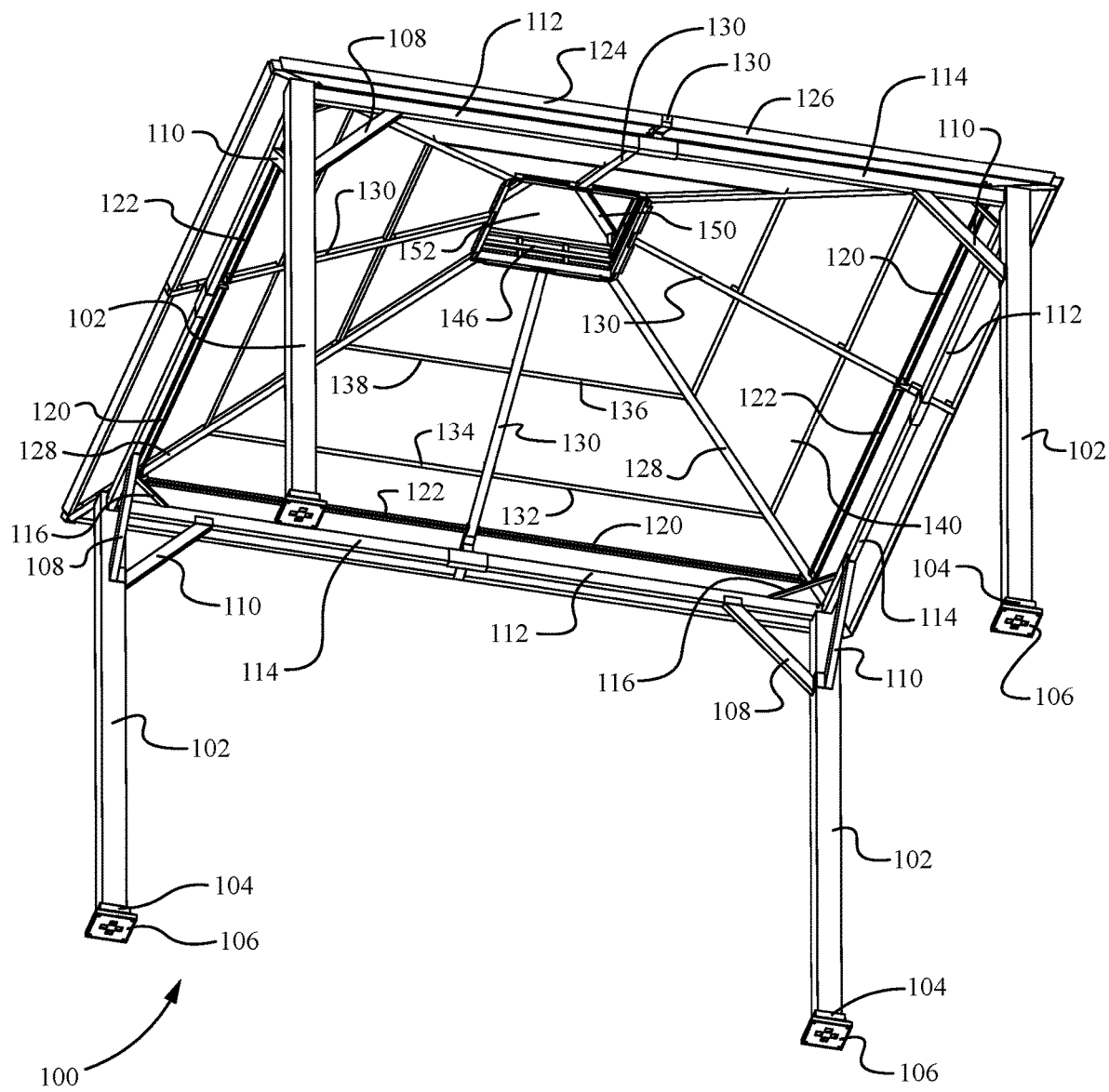
FIG. 9 is a bottom-front perspective view of the hardtop gazebo of FIG. 1.

With combined reference to FIGS. 1-6 and 9, it can be seen that each of the corners of the hardtop gazebo 100 is reinforced by means of a pair of diagonal support members 108, 110. That is, as best shown in FIG. 9, the diagonal support members 108, 110 attach the crossbeam members 112, 114 to sides of the corner support post members 102. That is, each diagonal support member 108, 110 is configured to be attached between a respective one of the corner support post members 102 and a respective one of the crossbeam members 112, 114. For additional support, each corner of the hardtop gazebo 100 is further reinforced by a corner support member 116, which attaches between crossbeam members 112, 114 (see FIGS. 8 and 9).

Figure 2:
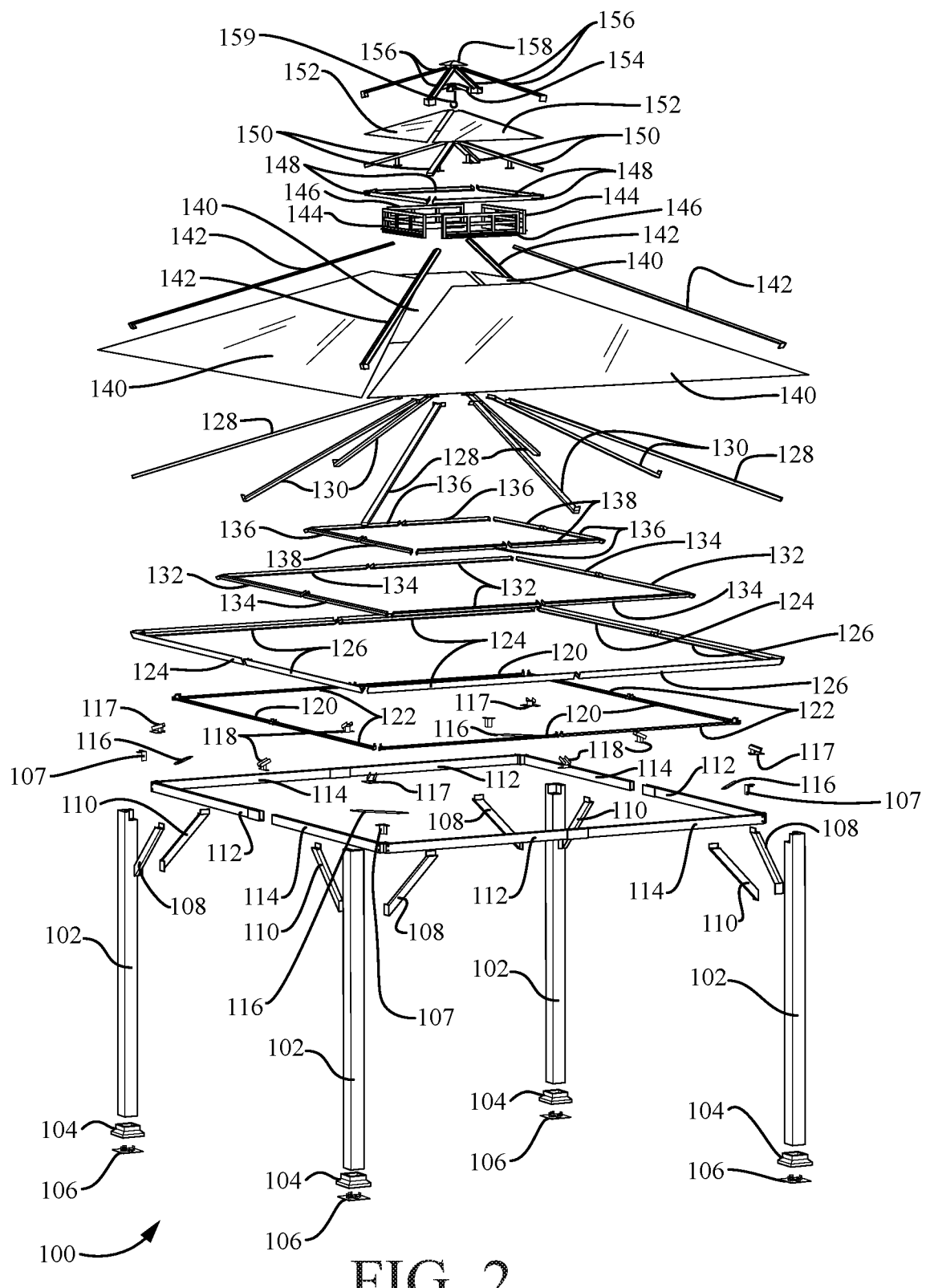
FIG. 2 is an exploded perspective view of the hardtop gazebo of FIG. 1.
Figure 3:
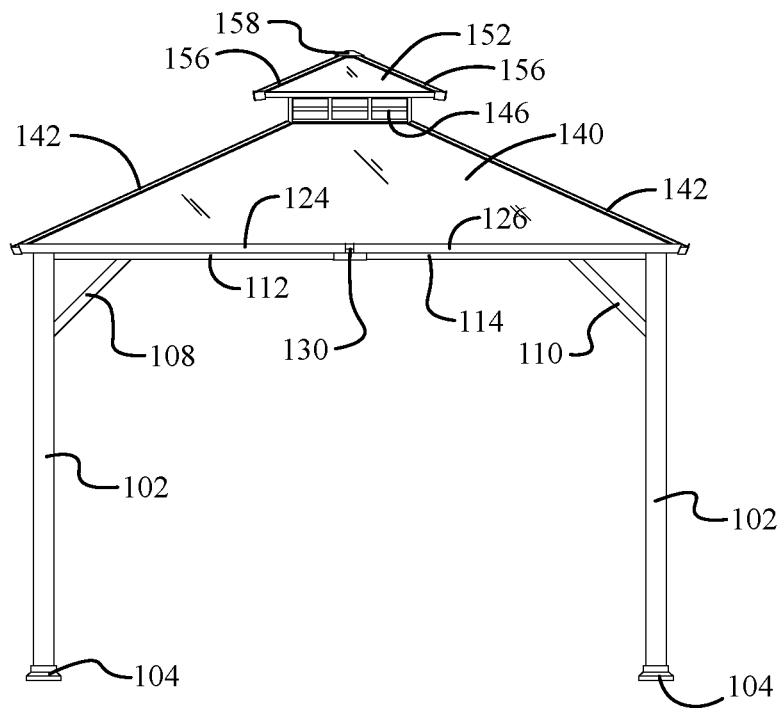
FIG. 3 is a front elevational view of the hardtop gazebo of FIG. 1.
Figure 4:
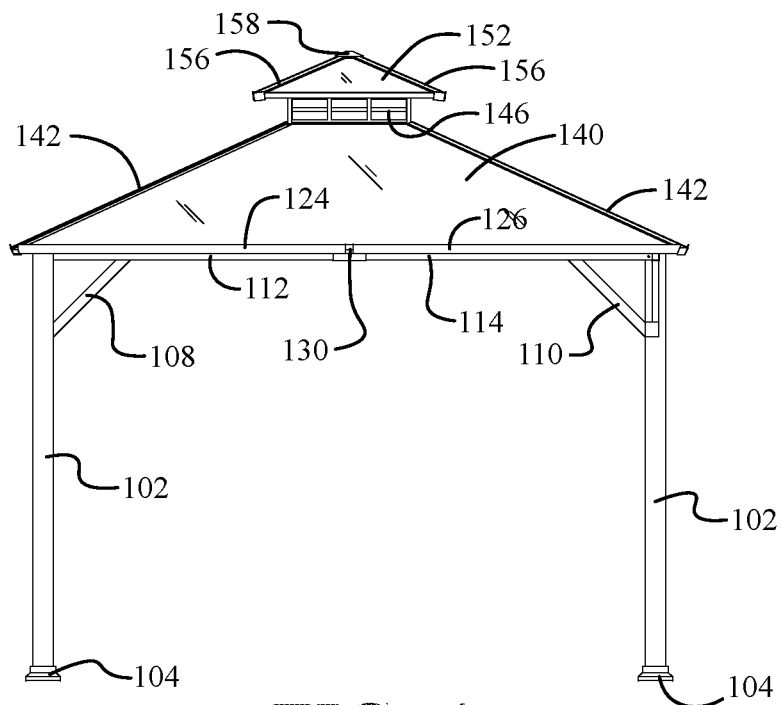
FIG. 4 is a rear elevational view of the hardtop gazebo of FIG. 1.
Figure 5:
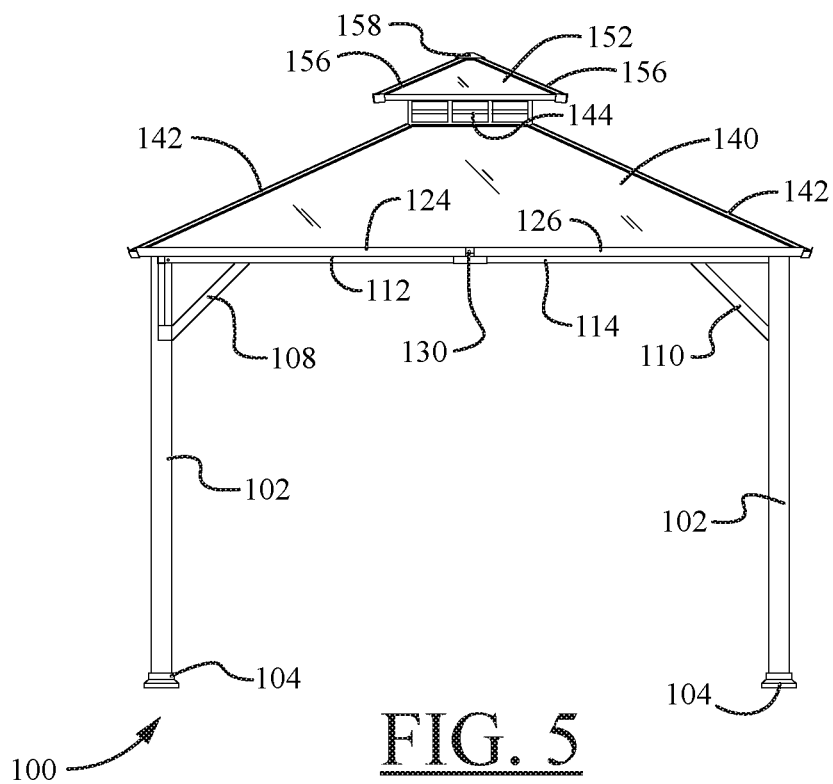
FIG. 5 is a first side elevational view of the hardtop gazebo of FIG. 1.
Figure 6:
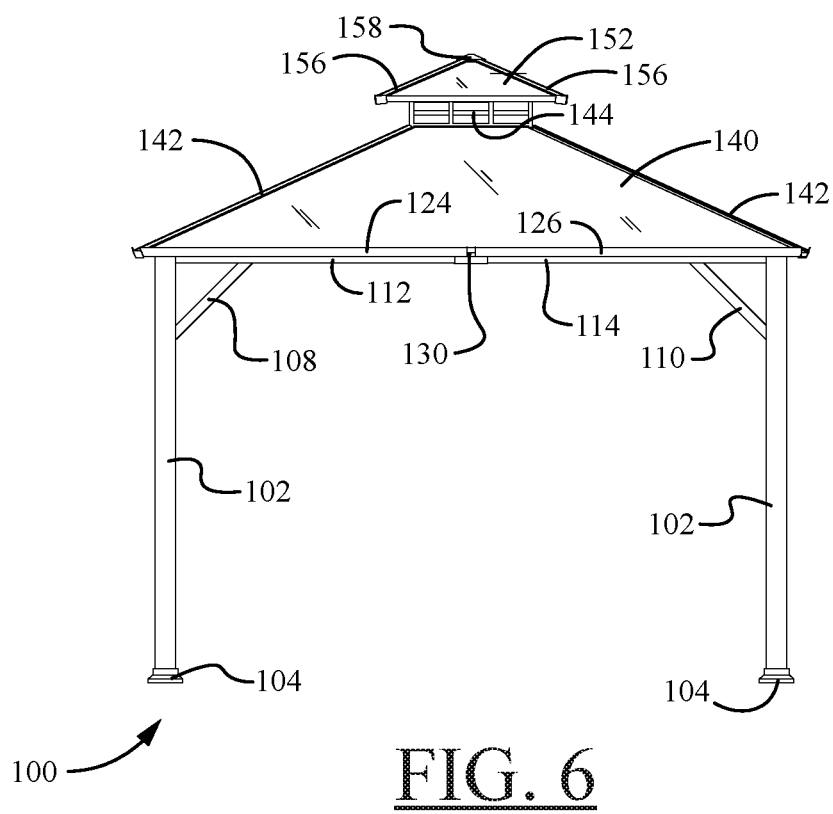
FIG. 6 is a second side elevational view of the hardtop gazebo of FIG. 1.

Next, with reference again to the exploded view of FIG. 2, the connecting members 117, 118 of the hardtop gazebo 100 will be explained in detail. As shown in FIG. 2, the middle connecting members 118 couple a respective one of the middle roof beam members 130 to a pair of crossbeam members 112, 114. Similarly, the corner connecting members 117 couple a respective one of the corner roof beam members 128 to a respective one of the corner support members 102.

Now, with initial reference to FIGS. 2, 8, and 9, the roof frame members of the hardtop gazebo 100 of the first illustrative embodiment will be described. In general, the roof frame members 124, 126, 128, 130, 132, 134, 136, 138 of the hardtop gazebo 100 comprise a set of radially extending roof beam members 128, 130 and additional sets of circumferentially extending roof beam members 124, 126, 132, 134, 136, 138. Initially, as shown in FIGS. 2, 8, and 9, the roof beam members 128, 130 are circumferentially spaced apart from one another so as to form a supporting structure for the large roof panels 140 described hereinafter. In the first illustrative embodiment, the roof beam members 128, 130 include four (4) diagonally oriented roof beam members 128 extending to respective corners of the roof of the hardtop gazebo 100, and four (4) middle roof beam members 130 disposed between pairs of the diagonally oriented roof beam members 128 (refer to FIGS. 8 and 9). Each of the diagonally oriented roof beam members 128 comprises a first end and a second end oppositely disposed relative to the first end. A first end of each of the diagonally oriented roof frame members 128 is coupled to a respective one of the corner post members 102 by means of one of the corner connecting members 117, and a second end of each of the diagonally oriented roof beam members 128 is coupled to an end portion of a roof vent wall member 144, 146 (see FIGS. 8 and 9). Each of the middle roof beam members 130 comprises a first end and a second end oppositely disposed relative to the first end. A first end of each of the middle roof beam members 130 is coupled to one, or both, of the crossbeam members 112, 114 by means of one of the middle connecting members 118, and a second end of each of the middle roof beam members 130 is coupled to a middle portion of a roof vent wall member 144, 146.

Turning again to FIGS. 2, 8, and 9, the circumferentially extending roof beam members 124, 126, 132, 134, 136, 138 of the first illustrative embodiment will be described. In general, the circumferentially extending roof beam members 124, 126, 132, 134, 136, 138 comprise concentrically arranged subsets of horizontal roof beam members (see FIGS. 8 and 9). The outermost subset of circumferentially extending roof beam members is formed by the roof beam members 124, 126 (i.e., four (4) roof beam members 124 and four (4) roof beam members 126). The roof beam members 124, 126 form the peripheral rim of the roof structure of the hardtop gazebo 100 (refer to FIG. 8). The middle subset of circumferentially extending roof beam members is formed by the roof beam members 132, 134 (i.e., four (4) roof beam members 132 and four (4) roof beam members 134). The roof beam members 132, 134 support the middle portions of the large roof panels 140 (see FIG. 9). The innermost subset of circumferentially extending roof beam members is formed by the roof beam members 136, 138 (i.e., four (4) roof beam members 136 and four (4) roof beam members 138). Similar to the roof beam members 132, 134, the roof beam members 136, 138 support the middle portions of the large roof panels 140 (refer to FIG. 9). As best shown in FIGS. 8 and 9, each of the roof beam members 124, 126, 132, 134, 136, 138 spans between the radially extending roof beam members 128, 130 so as to provide a roof support structure for the large roof panels 140. In the illustrative embodiment, at least some of the roof beam members 124, 126, 132, 134, 136, 138 may comprise diagonally oriented flange members located at oppositely disposed longitudinal ends of the roof beam members 124, 126, 132, 134, 136, 138 for attaching to the radially extending roof beam members 128 (see FIGS. 2 and 9).

Next, with reference to FIGS. 1-6 and 9, the roof vent structure of the illustrative hardtop gazebo 100 will be described. In the illustrative embodiment, the roof of the hardtop gazebo 100 comprises a large peripheral roof portion formed by large roof panels 140 and a small central roof portion formed by small roof panels 152. The roof vent is defined between the large peripheral roof portion and the small central roof portion (see FIGS. 1 and 3-6). As shown in these figures of the first illustrative embodiment, the periphery of the roof vent of the hardtop gazebo 100 is defined by a plurality of roof vent wall members 144, 146 (i.e., two (2) roof vent wall members 144 and two (2) roof vent wall members 146). In the illustrative embodiment, each of the roof vent wall members 144 comprises a plurality of rectangular-shaped apertures formed therein so as to allow hot air to be vented from the interior of the hardtop gazebo 100. In the illustrative embodiment, the top of the roof vent of the hardtop gazebo 100 is defined by a roof structure that includes the four (4) triangular-shaped roof panels 152 supported on diagonal roof beam members 150 and peripheral roof beam members 148 (see FIG. 2). An upper end of each of the diagonal roof beam members 150 is designed to be inserted into a respective outwardly extending channel portion of a central connecting member 154 (see FIGS. 2 and 8). The central connecting member 154 has a central body portion with a plurality of peripheral channel members extending outwardly therefrom. As such, the central connecting member 154 generally resembles an octopus, wherein the central body portion forms the body of the octopus and the peripheral channel members form the legs of the octopus. As shown in the bottom plan view of FIG. 8, each of the diagonal roof beam members 150 engages with a respective one of the peripheral channel members of the central connecting member 154 so that a generally rigid roof structure for the roof vent is formed thereby. A lower end of each of the diagonal roof beam members 150 is coupled to peripheral roof beam members 148 (see FIG. 2).

Figure 7:
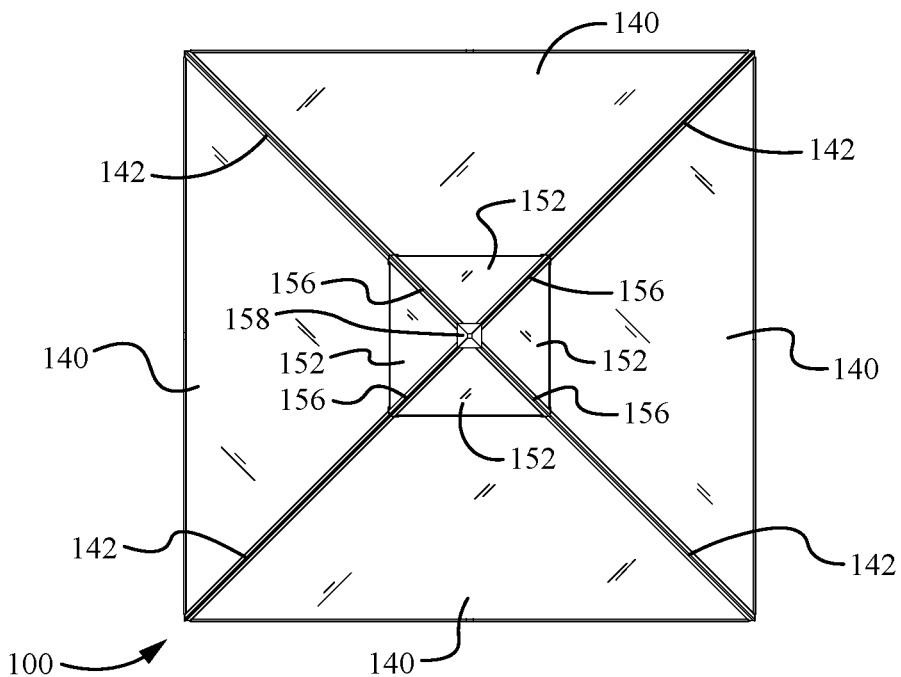
FIG. 7 is a top plan view of the hardtop gazebo of FIG. 1.

Turning to FIGS. 1, 2, 8, and 9, the roof structure and other features of the hardtop gazebo 100 will now be described. As best shown in FIGS. 1 and 2, the large peripheral roof portion formed by the four (4) trapezoidal-shaped roof panels 140 covers a majority of the roof framing system, while the small central roof portion formed by the four (4) triangular-shaped roof panels 152 covers the roof vent framing members. Together the four (4) trapezoidal-shaped large roof panels 140 and the four (4) triangular-shaped small roof panels 152 form the roof of the hardtop gazebo 100. To seal the seams between the adjacent large roof panels 140, roof edge sealing strips 142 are used. Similarly, to seal the seams between the adjacent small roof panels 152, roof edge sealing strips 156 are used. In FIGS. 1, 2, and 7, it can be seen that a small roof cover 158 is provided at the central peak of the small central roof portion to seal the opening at the central peak. For example, the small roof cover 158 may be attached to the central connecting member 154 by a suitable fastener (e.g., by a bolt). In FIG. 2, it can be seen that the underside of the central connecting member 154 is provided with a hook member 159 attached thereto (e.g., the end portion of the hook member 159 may be provided with a plurality of external threads that matingly engage with a plurality of internal threads on the central connecting member 154). As an example, the hook member 159 may be used for holding a hanging plant or a light inside the hardtop gazebo 100.

Also, in the first illustrative embodiment, the hardtop gazebo 100 may be provided with a plurality of netting tubes 120, 122 that span between the radially extending roof beam members 128, 130 (see FIGS. 2, 8, and 9) so as to provide a support structure for side curtain netting of the hardtop gazebo 100. The side curtain netting may be designed to permit airflow therethrough, yet keep insects from entering the interior of the hardtop gazebo 100. The side curtain netting may be supported from the netting tubes 120, 122 of the hardtop gazebo 100 by fastening straps or other suitable fastening members.

In one or more embodiments, the constituent components of the hardtop gazebo framing system (e.g., as illustrated in FIGS. 1 and 2) are formed from a suitable metallic material, such as steel, while the side curtain netting is formed from a suitable fabric, such as a polyester fabric material. However, those of ordinary skill in the art will appreciate that other suitable materials can be used for the various components of the hardtop gazebo 100 as well.

A second illustrative embodiment of the hardtop gazebo is seen generally at 200 in FIGS. 10-26. Referring to these figures, it can be seen that, in many respects, the second illustrative embodiment is similar to that of the first embodiment. Moreover, many elements are common to both such embodiments. For the sake of brevity, the elements that the second embodiment of the hardtop gazebo has in common with the first embodiment will not be discussed in detail because these components have already been explained in detail above.

Figure 10:
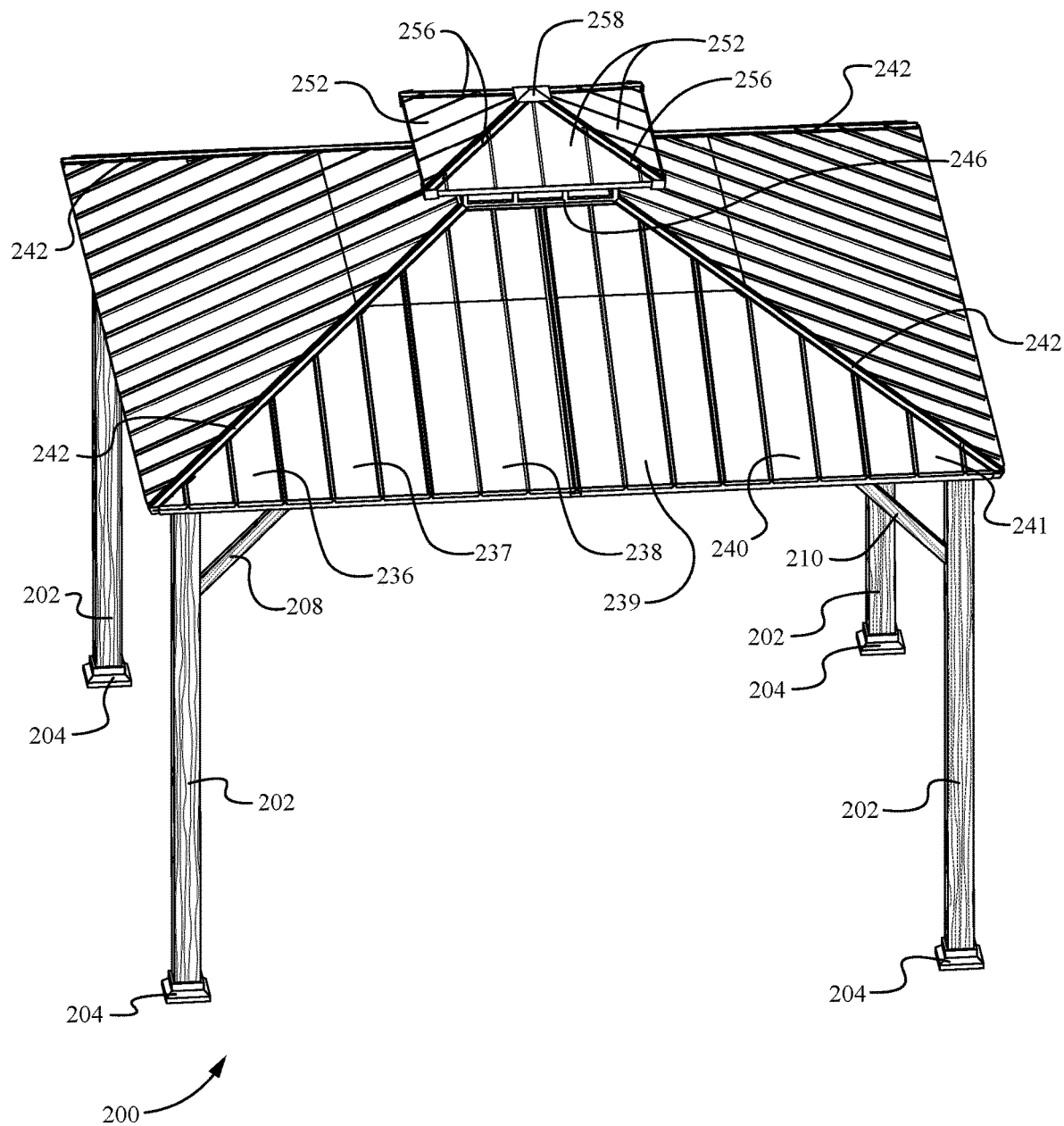
FIG. 10 is a front-top perspective view of a hardtop gazebo, according to a second illustrative embodiment of the invention.
Figure 11:
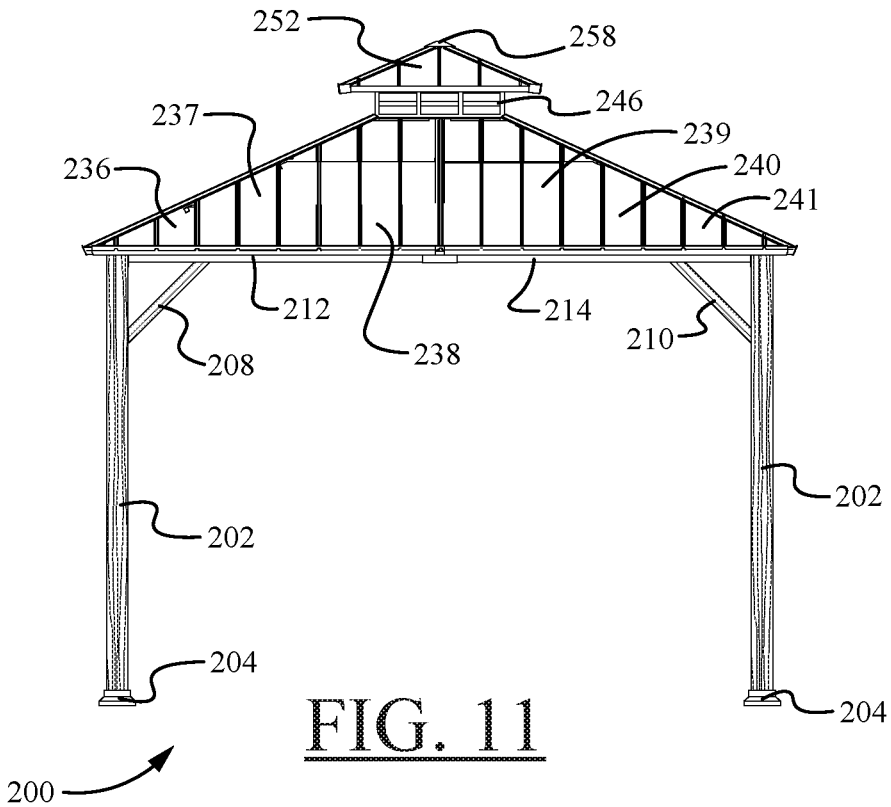
FIG. 11 is a front elevational view of the hardtop gazebo of FIG. 10.
Figure 12:
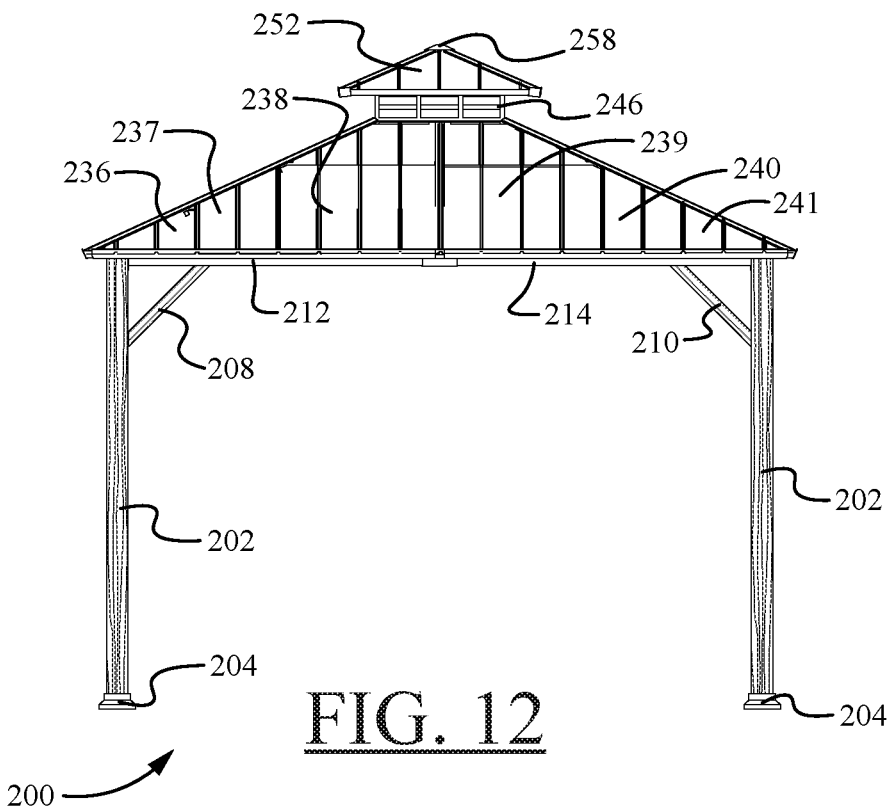
FIG. 12 is a rear elevational view of the hardtop gazebo of FIG. 10.
Figure 13:
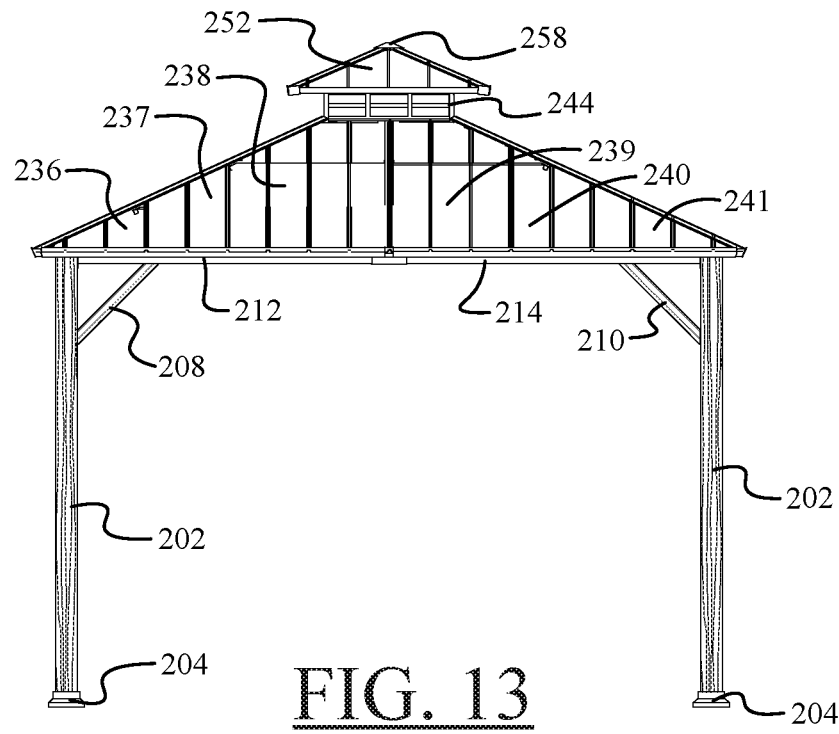
FIG. 13 is a first side elevational view of the hardtop gazebo of FIG. 10.
Figure 14:
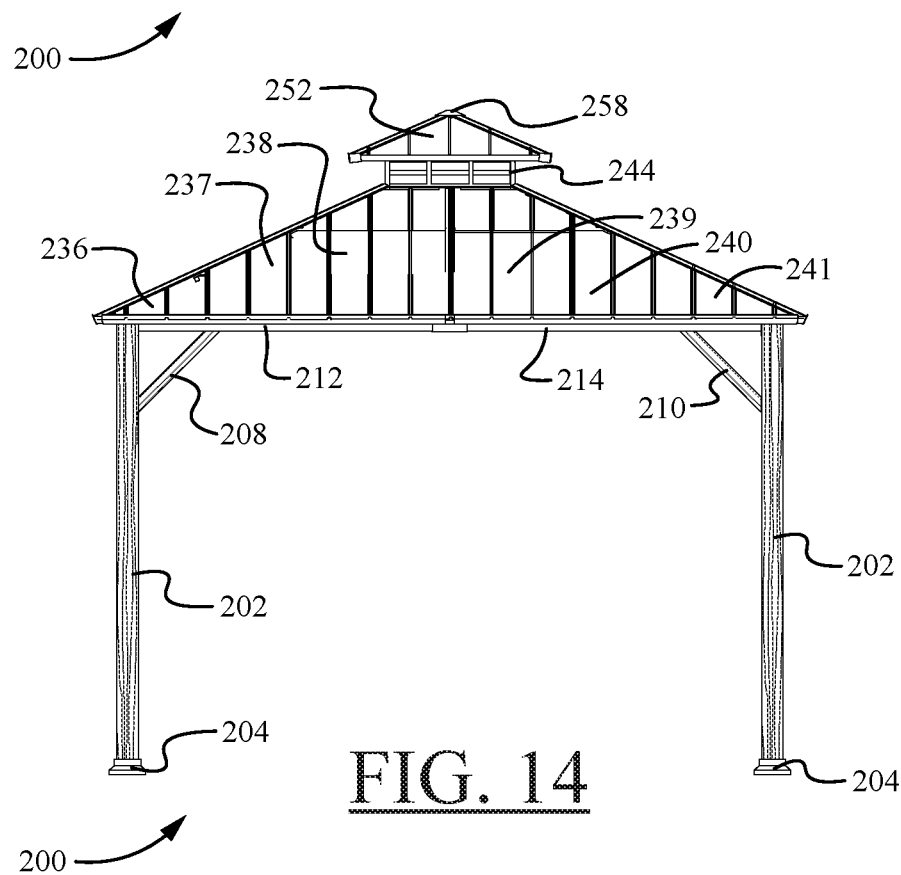
FIG. 14 is a second side elevational view of the hardtop gazebo of FIG. 10.
Figure 18:
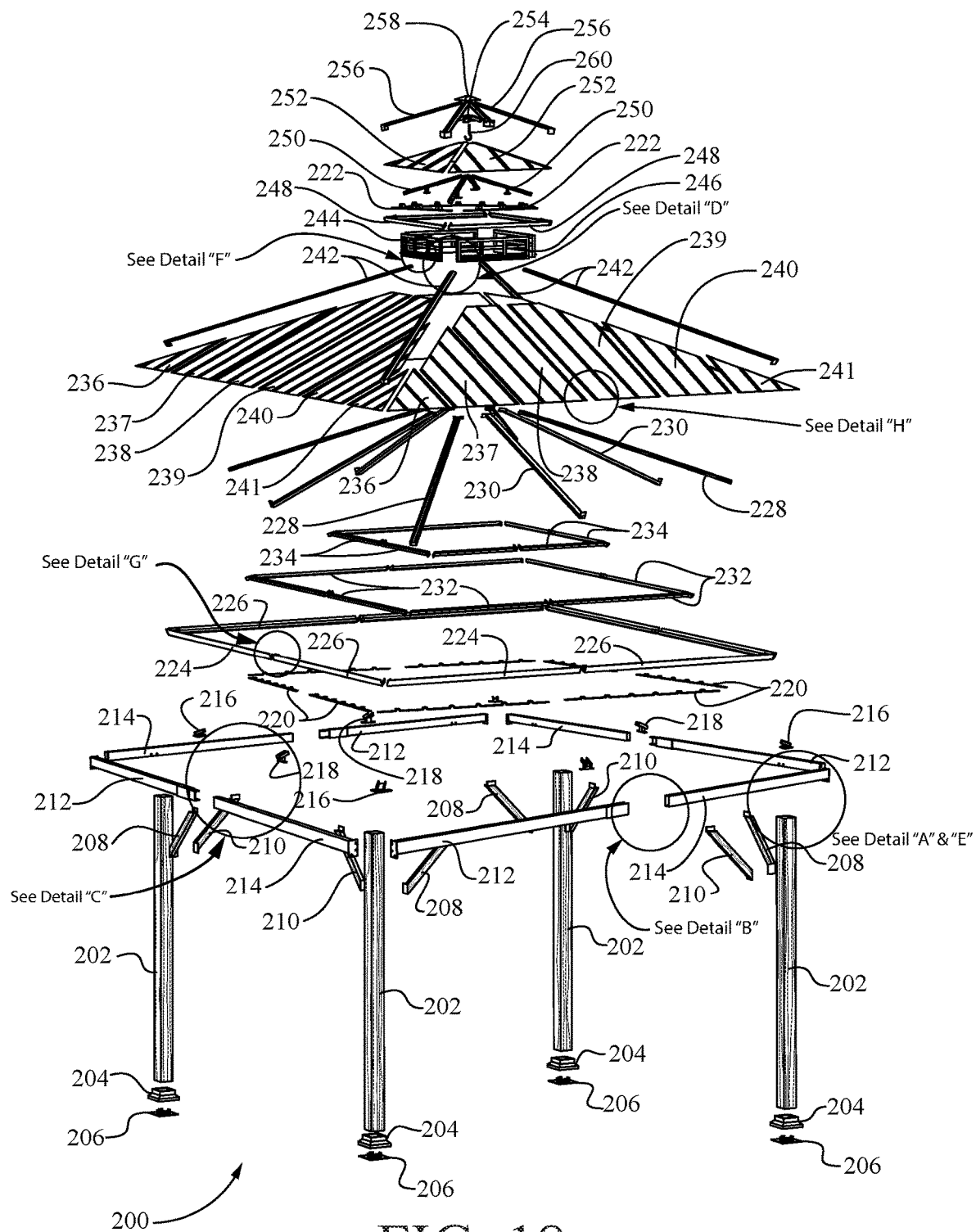
FIG. 18 is an exploded perspective view of the hardtop gazebo of FIG. 10.

Initially, referring primarily to the assembled perspective view of FIG. 10 and the exploded perspective view of FIG. 18, it can be seen that the hardtop gazebo 200 generally comprises a plurality of corner support members (e.g., four (4) corner support posts 202); a plurality of crossbeam members 212, 214, the crossbeam members 212, 214 configured to be connected between a pair of the plurality of corner support members 202; a plurality of roof frame members 224, 226, 228, 230, 232, 234, at least some of the roof frame members 224, 226, 228, 230, 232, 234 configured to be circumferentially spaced apart from one another so as to form a supporting structure for a roof of the hardtop gazebo 200; and a plurality of connecting members 216, 218, a first set of the plurality of connecting members 216 configured to couple respective ones of the plurality of roof frame members 228 to respective ones of the plurality of corner support members 202, and a second set of the plurality of connecting members 218 configured to couple respective ones of the plurality of roof frame members 230 to respective ones of the plurality of crossbeam members 212, 214.

As shown in FIGS. 10-14 and 18, the corner support members of the hardtop gazebo 200 of the second illustrative embodiment are in the form of corner post members 202. With reference to the exploded view of FIG. 18, it can be seen that each of the corner support post members 202 is provided with a respective base plate member 206 and a post base cover 204 to conceal each base plate member 206.

Now, with reference to FIGS. 11-14 and 18, the crossbeam members 212, 214 of the hardtop gazebo 200 will be described in detail. As best shown in the exploded perspective view of FIG. 18, each of the four sides of the hardtop gazebo 200 includes a pair of crossbeam members 212, 214. In the illustrative embodiment, the inner ends of each crossbeam member 212, 214 are joined together by means of a central connection sleeve (see the detailed view in FIG. 20), while the outer ends of each crossbeam member 212, 214 are connected to respective sides of the corner support post members 202 (see FIG. 17). As shown in the typical detail view of FIG. 20, the inner end of each crossbeam member 214 is secured to the inner end of each crossbeam member 212 using one or more fasteners (e.g., bolts or screws 278) with lock washers 280 and washers 282 passing through fastener apertures 276 in the top side of the crossbeam member 214 and through corresponding apertures in the top side of the crossbeam member 212.

Figure 17:
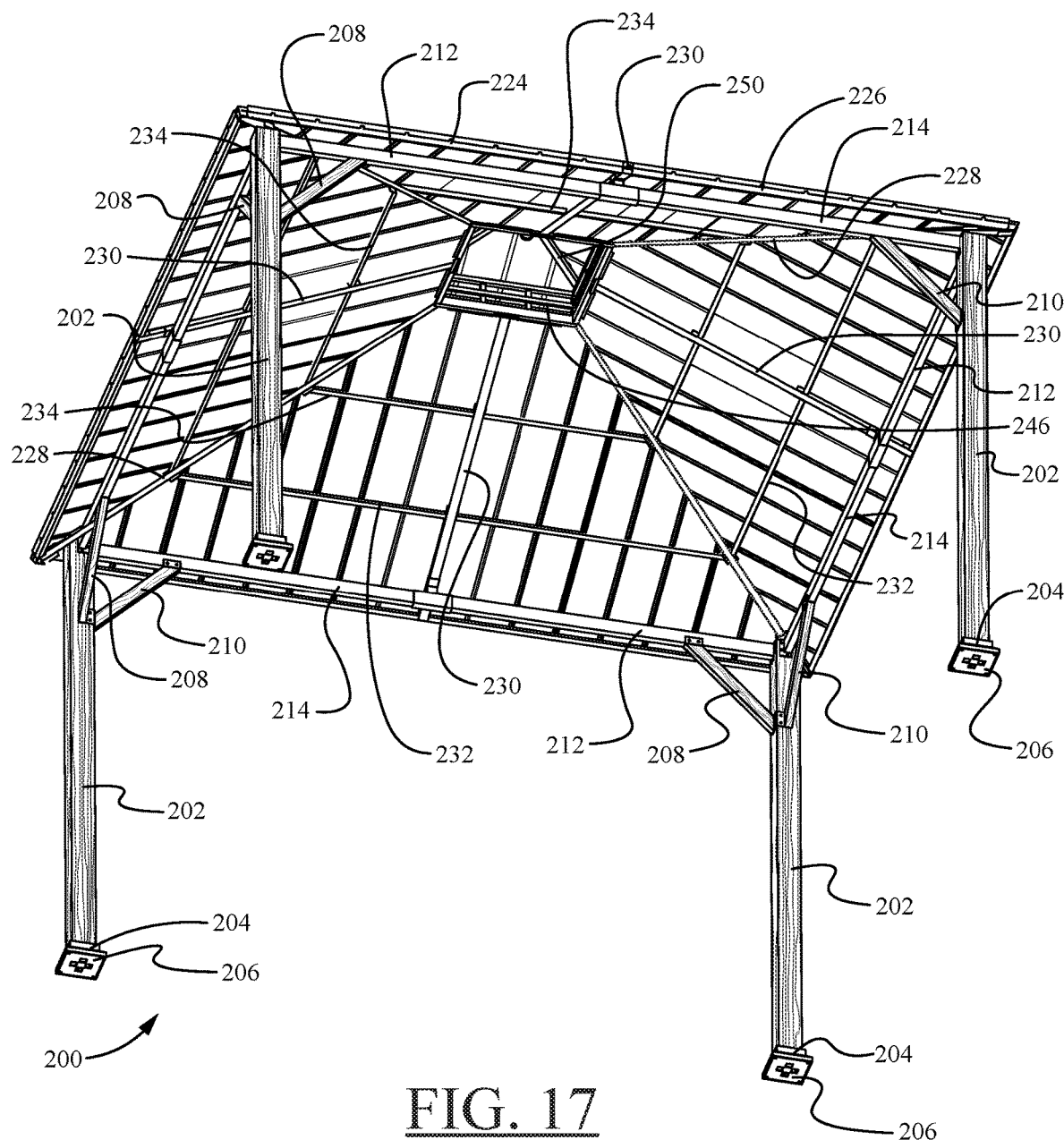
FIG. 17 is a bottom-front perspective view of the hardtop gazebo of FIG. 10.

With combined reference to FIGS. 10-14 and 17, it can be seen that each of the corners of the hardtop gazebo 200 is reinforced by means of a pair of diagonal support members 208, 210. That is, as best shown in FIG. 17, the diagonal support members 208, 210 attach the crossbeam members 212, 214 to sides of the corner support post members 202. That is, each diagonal support member 208, 210 is configured to be attached between a respective one of the corner support post members 202 and a respective one of the crossbeam members 212, 214.

Figure 19:
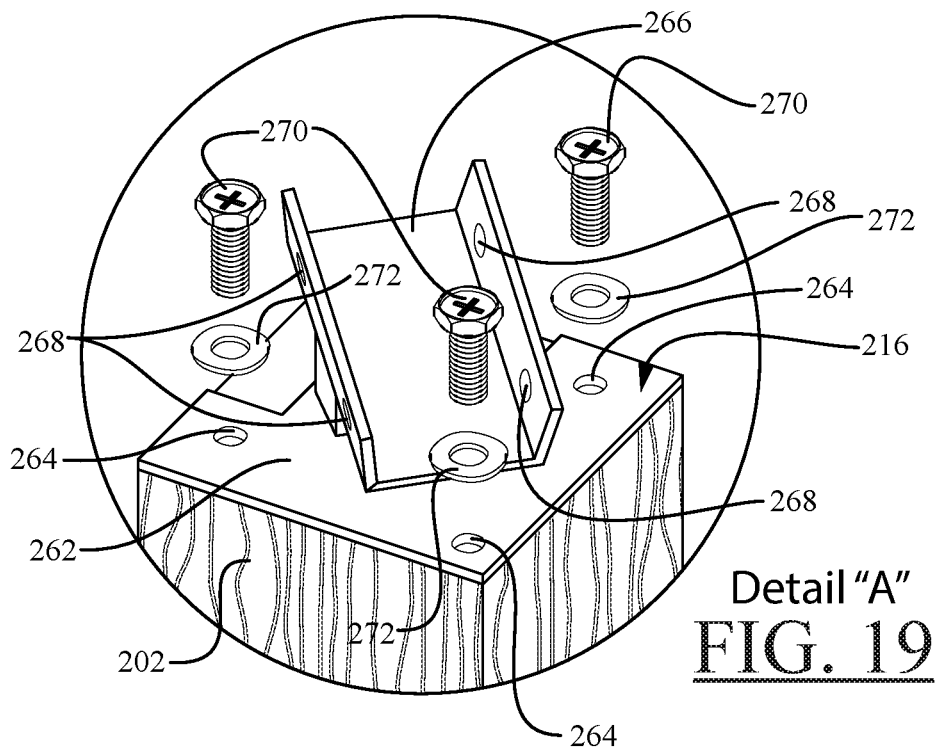
FIG. 19 is an enlarged, partial perspective view of the connection between one of the corner connecting members and one of the support post members in FIG. 18 (Detail "A"), according to the second illustrative embodiment of the invention.

Next, with reference again to the exploded view of FIG. 18, the connecting members 216, 218 of the hardtop gazebo 200 will be explained in detail. As shown in FIG. 18, the middle connecting members 218 couple a respective one of the middle roof beam members 230 to a pair of crossbeam members 212, 214. Similarly, the corner connecting members 216 couple a respective one of the corner roof beam members 228 to a respective one of the corner support members 202. As shown in the typical detail view of FIG. 19, each corner connecting member 216 comprises a base plate portion 262 with a plurality of fastener apertures 264 disposed therethrough for receiving respective fasteners (e.g., bolts or screws 270) for securing the corner connecting member 216 to the top end of one of the corner support members 202. Also, as shown in FIG. 19, in the illustrative embodiment, each fastener 270 is provided with a respective washer 272 that is configured to be disposed between the head of the fastener 270 and the top surface of the base plate portion 262 of the corner connecting member 216. Referring again to FIG. 19, it can be seen that each corner connecting member 216 further comprises an elevated tray portion 266 connected to the base plate portion 262 of the corner connecting member 216. The elevated tray portion 266 of the corner connecting member 216 supports a lower end portion of a respective corner roof beam member 228 of the roof frame structure of the hardtop gazebo 200 (see FIG. 23). More specifically, as shown in the typical detail view of FIG. 23, the lower end portion of a respective corner roof beam member 228 is secured to the elevated tray portion 266 of the corner connecting member 216 by means of fasteners (e.g., bolts or screws 296) with washers 298 passing through fastener apertures 268 in the opposed sides of the elevated tray portion 266 and through corresponding apertures in the opposed sides of the corner roof beam member 228.

Figure 20:
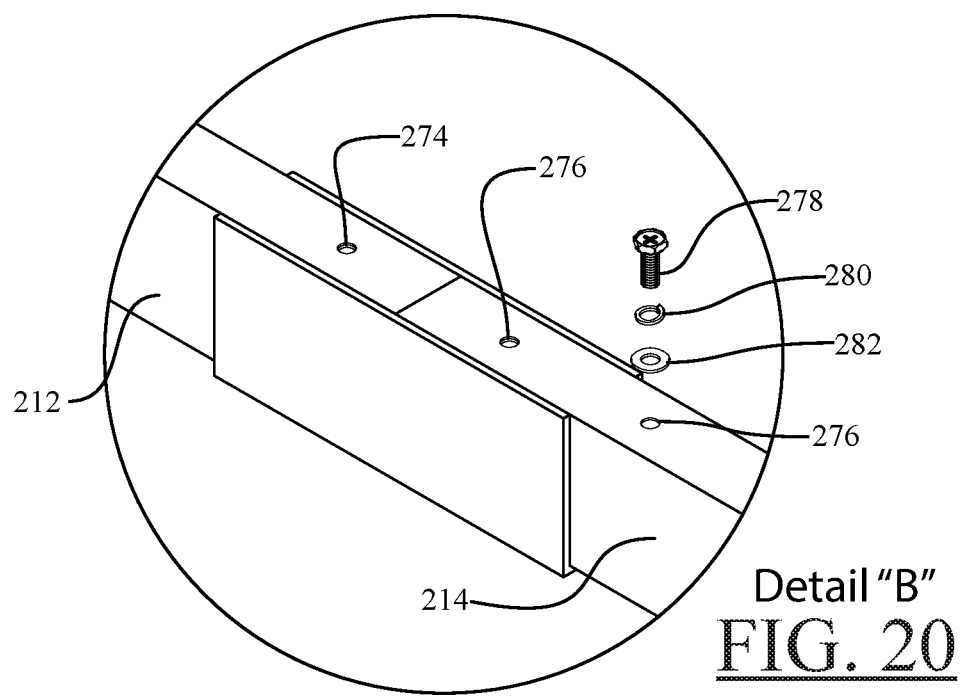
FIG. 20 is an enlarged, partial perspective view of the connection between a pair of crossbeam members in FIG. 18 (Detail "B"), according to the second illustrative embodiment of the invention.
Figure 21:
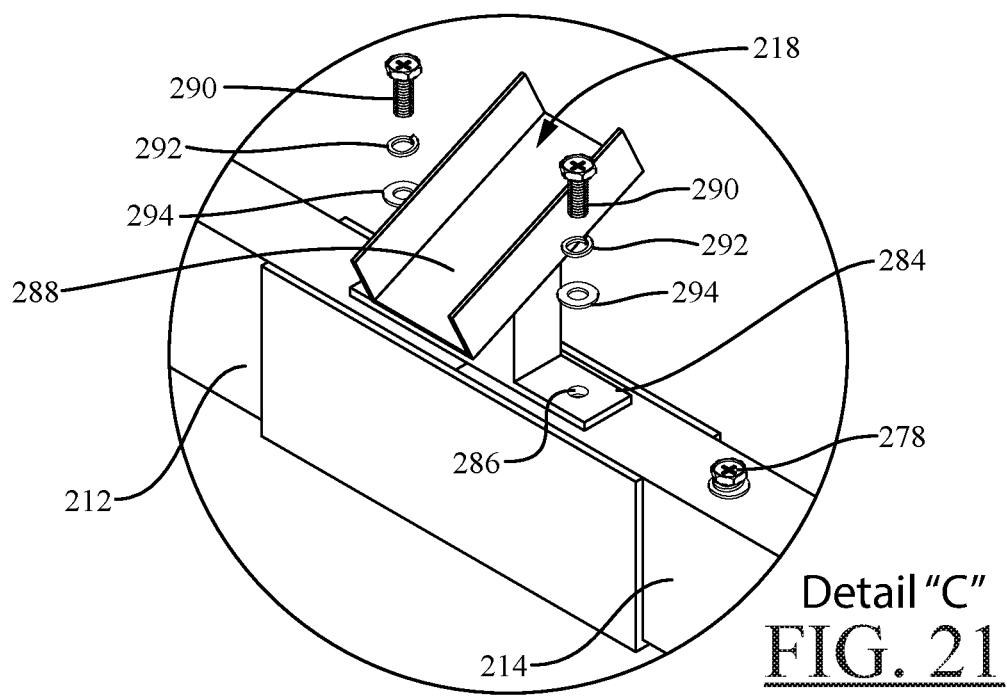
FIG. 21 is an enlarged, partial perspective view of the connection between one of the middle connecting members and a pair of crossbeam members in FIG. 18 (Detail "C"), according to the second illustrative embodiment of the invention.

As shown in the typical detail view of FIG. 21, similar to the corner connecting members 216 described above, each middle connecting member 218 comprises a base plate portion 284 with a plurality of fastener apertures 286 disposed therethrough for receiving respective fasteners (e.g., bolts or screws 290) for securing the middle connecting member 218 to joined inner ends of the crossbeam members 212, 214 (i.e., the fasteners 290 pass through the fastener apertures 274, 276 in the crossbeam members 212, 214—see FIG. 20). Also, as shown in FIG. 21, in the illustrative embodiment, each fastener 290 is provided with a respective lock washer 292 and respective washer 294 that is configured to be disposed between the head of the fastener 290 and the top surface of the base plate portion 284 of the middle connecting member 218. Referring again to FIG. 21, it can be seen that each middle connecting member 218 further comprises an elevated tray portion 288 connected to the base plate portion 284 of the middle connecting member 218. The elevated tray portion 288 of the middle connecting member 218 supports a lower end portion of a respective middle roof beam member 230 of the roof frame structure of the hardtop gazebo 200 (see FIG. 17).

Figure 16:
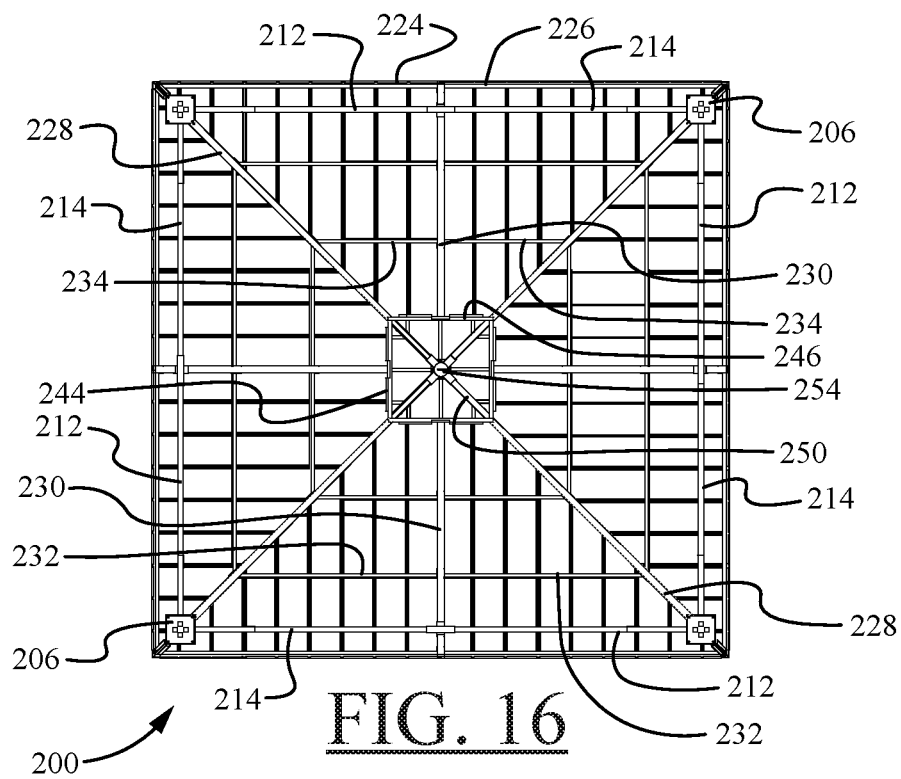
FIG. 16 is a bottom plan view of the hardtop gazebo of FIG. 10.

Now, with initial reference to FIGS. 16-18, the roof frame members of the hardtop gazebo 200 of the second illustrative embodiment will be described. In general, the roof frame members 224, 226, 228, 230, 232, 234 of the hardtop gazebo 200 comprise a set of radially extending roof beam members 228, 230 and additional sets of circumferentially extending roof beam members 224, 226, 232, 234. Initially, as shown in FIGS. 16-18, the roof beam members 228, 230 are circumferentially spaced apart from one another so as to form a supporting structure for the large roof panels 236, 237, 238, 239, 240, 241 described hereinafter. In the second illustrative embodiment, the roof beam members 228, 230 include four (4) diagonally oriented roof beam members 228 extending to respective corners of the roof of the hardtop gazebo 200, and four (4) middle roof beam members 230 disposed between pairs of the diagonally oriented roof beam members 228 (refer to FIGS. 16 and 17). Each of the diagonally oriented roof beam members 228 comprises a first end and a second end oppositely disposed relative to the first end. A first end of each of the diagonally oriented roof frame members 228 is coupled to a respective one of the corner post members 202 by means of one of the corner connecting members 216, and a second end of each of the diagonally oriented roof beam members 228 is coupled to an end portion of a roof vent wall member 244, 246 (see FIGS. 16, 17, and 22). Each of the middle roof beam members 230 comprises a first end and a second end oppositely disposed relative to the first end. A first end of each of the middle roof beam members 230 is coupled to one, or both, of the crossbeam members 212, 214 by means of one of the middle connecting members 218, and a second end of each of the middle roof beam members 230 is coupled to a middle portion of a roof vent wall member 244, 246 (see FIG. 24).

Figure 22:
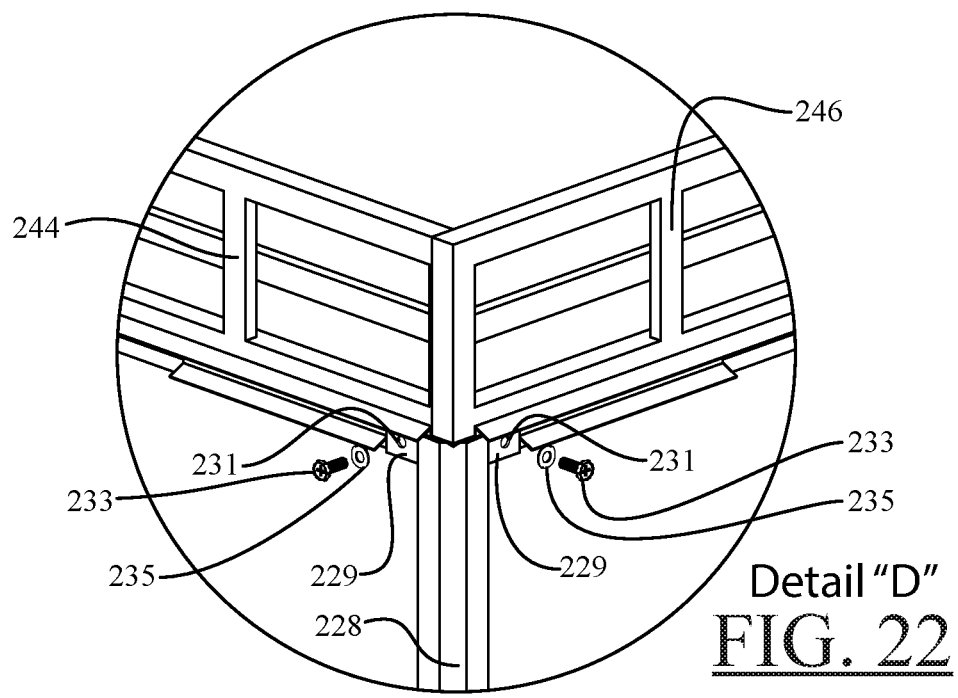
FIG. 22 is an enlarged, partial perspective view of the connection between one of the corner roof beam members and a pair of roof vent wall members in FIG. 18 (Detail "D"), according to the second illustrative embodiment of the invention.
Figure 23:
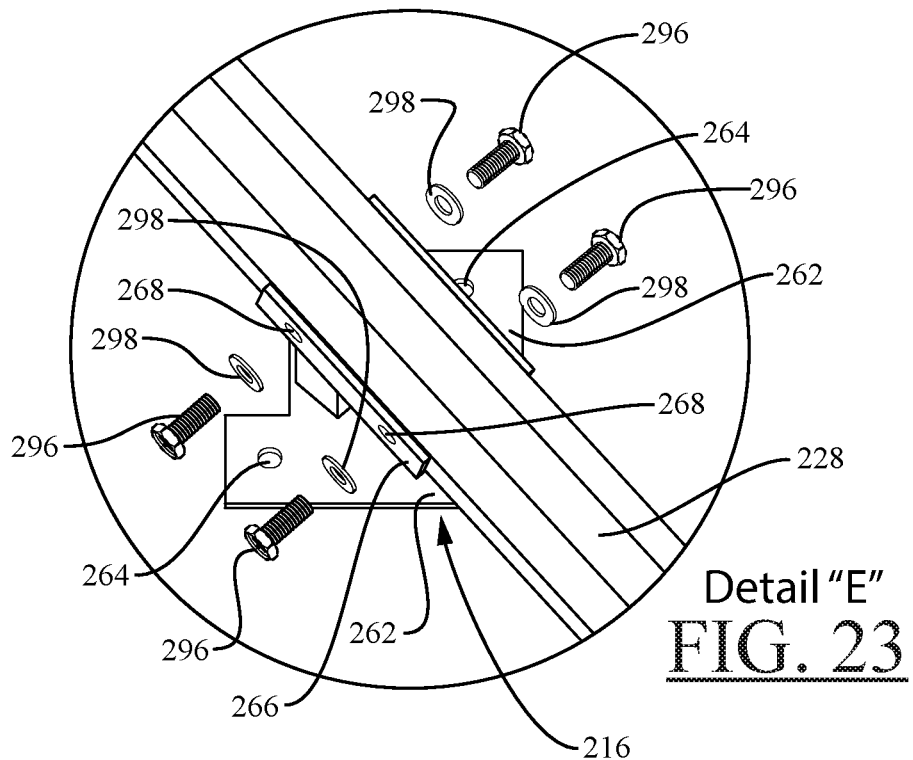
FIG. 23 is an enlarged, partial perspective view of the connection between one of the corner roof beam members and one of the corner connecting members in FIG. 18 (Detail "E"), according to the second illustrative embodiment of the invention.

As shown in the typical detail view of FIG. 22, the upper end of each corner roof beam member 228 comprises opposed flange portions 229 with a fastener aperture 231 disposed through each of the flange portions 229 for receiving a respective fastener (e.g., bolt or screw 233) for securing the corner roof beam member 228 to a corner of joined roof vent wall member 244, 246. Also, as shown in FIG. 22, in the illustrative embodiment, each fastener 233 is provided with a respective washer 235 that is configured to be disposed between the head of the fastener 233 and the top surface of the flange portion 229 of the corner roof beam member 228.

Figure 24:
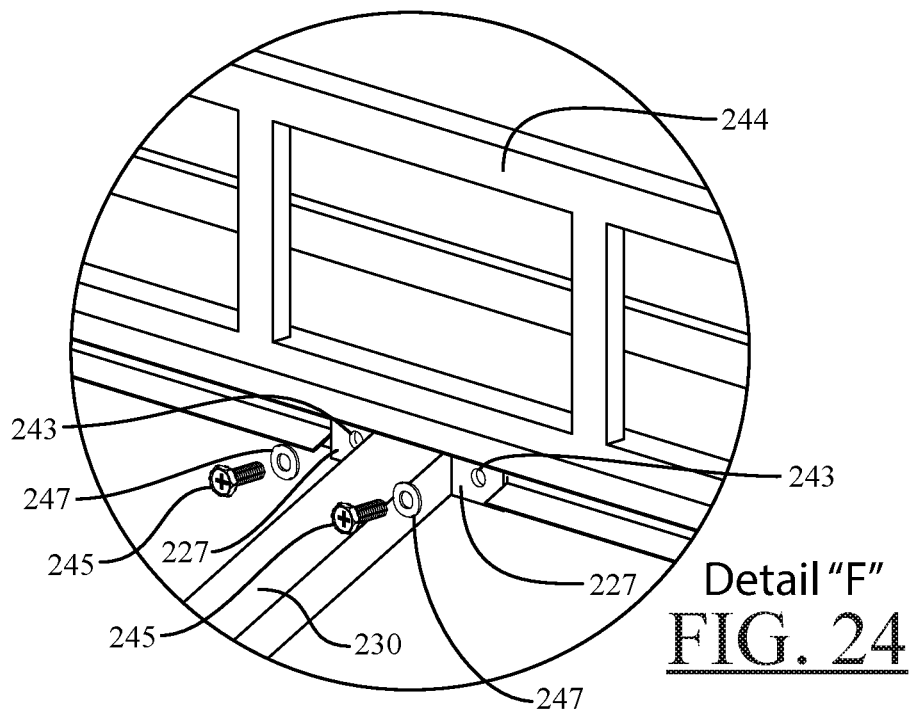
FIG. 24 is an enlarged, partial perspective view of the connection between one of the middle roof beam members and one of the roof vent wall members in FIG. 18 (Detail "F"), according to the second illustrative embodiment of the invention.

Also, as shown in the typical detail view of FIG. 24, similar to the corner roof beam members 228, the upper end of each middle roof beam member 230 comprises opposed flange portions 227 with a fastener aperture 243 disposed through each of the flange portions 227 for receiving a respective fastener (e.g., bolt or screw 245) for securing the middle roof beam member 230 to a middle portion of the roof vent wall member 244 (or roof vent wall member 246 on two of the sides of the gazebo). In addition, as shown in FIG. 24, in the illustrative embodiment, each fastener 245 is provided with a respective washer 247 that is configured to be disposed between the head of the fastener 245 and the outer surface of the flange portion 227 of the middle roof beam member 230.

Figure 25:
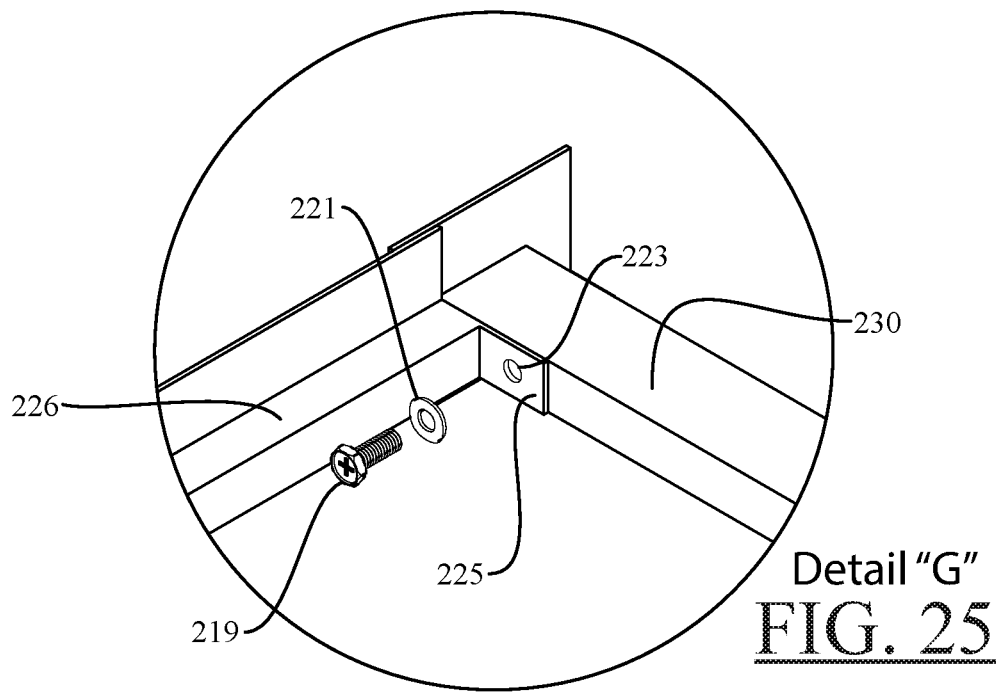
FIG. 25 is an enlarged, partial perspective view of the connection between one of the middle roof beam members and one of the transverse roof beam members in FIG. 18 (Detail "G"), according to the second illustrative embodiment of the invention.
Figure 26:
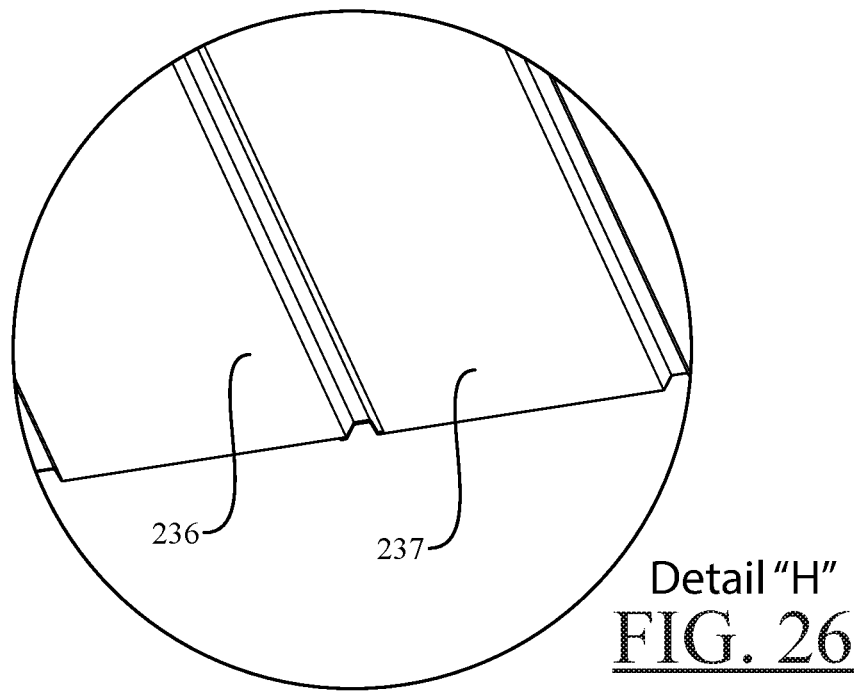
FIG. 26 is an enlarged, partial perspective view of the overlapping engagement between a pair of the ribbed roof panel members in FIG. 18 (Detail "H").

Referring to the typical detail view of FIG. 25, it can be seen that the lower end of each middle roof beam member 230 is secured to the flange portion 225 of roof beam member 226 (and similarly, to the flange portion of roof beam member 224 on the opposite side of middle roof beam member 230—see FIG. 17). In particular, the flange portion 225 of the roof beam member 226 comprises a fastener aperture 223 disposed therethrough for receiving a fastener (e.g., bolt or screw 219) for securing the roof beam member 226 to the side of the middle roof beam member 230. In addition, as shown in FIG. 25, in the illustrative embodiment, each fastener 219 is provided with a respective washer 221 that is configured to be disposed between the head of the fastener 219 and the outer surface of the flange portion 225 of the roof beam member 226.

Turning again to FIGS. 16-18, the circumferentially extending roof beam members 224, 226, 232, 234 of the second illustrative embodiment will be described. In general, the circumferentially extending roof beam members 224, 226, 232, 234 comprise concentrically arranged subsets of horizontal roof beam members (see FIGS. 16 and 17). The outermost subset of circumferentially extending roof beam members is formed by the roof beam members 224, 226 (i.e., four (4) roof beam members 224 and four (4) roof beam members 226). The roof beam members 224, 226 form the peripheral rim of the roof structure of the hardtop gazebo 200 (refer to FIG. 16). The middle subset of circumferentially extending roof beam members is formed by the roof beam members 232 (i.e., eight (8) roof beam members 232). The roof beam members 232 support the middle portions of the large roof panels 236, 237, 238, 239, 240, 241 (see FIG. 17). The innermost subset of circumferentially extending roof beam members is formed by the roof beam members 234 (i.e., eight (8) roof beam members 234). Similar to the roof beam members 232, the roof beam members 234 support the middle portions of the large roof panels 236, 237, 238, 239, 240, 241 (refer to FIG. 17). As best shown in FIGS. 16 and 17, each of the roof beam members 224, 226, 232, 234 spans between the radially extending roof beam members 228, 230 so as to provide a roof support structure for the large roof panels 236, 237, 238, 239, 240, 241. In the illustrative embodiment, at least some of the roof beam members 224, 226, 232, 234 may comprise diagonally oriented flange members located at oppositely disposed longitudinal ends of the roof beam members 224, 226, 232, 234 for attaching to the radially extending roof beam members 228 (see FIGS. 17 and 18).

Next, with reference to FIGS. 10-14 and 17, the roof vent structure of the illustrative hardtop gazebo 200 will be described. In the illustrative embodiment, the roof of the hardtop gazebo 200 comprises a large peripheral roof portion formed by large roof panels 236, 237, 238, 239, 240, 241 and a small central roof portion formed by small roof panels 252. The roof vent is defined between the large peripheral roof portion and the small central roof portion (see FIGS. 10-14). As shown in these figures of the second illustrative embodiment, the periphery of the roof vent of the hardtop gazebo 200 is defined by a plurality of roof vent wall members 244, 246 (i.e., two (2) roof vent wall members 244 and two (2) roof vent wall members 246). In the illustrative embodiment, each of the roof vent wall members 244 comprises a plurality of rectangular-shaped apertures formed therein so as to allow hot air to be vented from the interior of the hardtop gazebo 200. In the illustrative embodiment, the top of the roof vent of the hardtop gazebo 200 is defined by a roof structure that includes the four (4) triangular-shaped roof panels 252 supported on diagonal roof beam members 250 and peripheral roof beam members 248. An upper end of each of the diagonal roof beam members 250 is designed to be inserted into a respective outwardly extending channel portion of a central connecting member 254 (see FIGS. 16 and 18). The central connecting member 254 has a central body portion with a plurality of peripheral channel members extending outwardly therefrom. As such, the central connecting member 254 generally resembles an octopus, wherein the central body portion forms the body of the octopus and the peripheral channel members form the legs of the octopus. As shown in the bottom plan view of FIG. 16, each of the diagonal roof beam members 250 engages with a respective one of the peripheral channel members of the central connecting member 254 so that a generally rigid roof structure for the roof vent is formed thereby. A lower end of each of the diagonal roof beam members 250 is coupled to peripheral roof beam members 248 (see FIG. 18).

Figure 15:
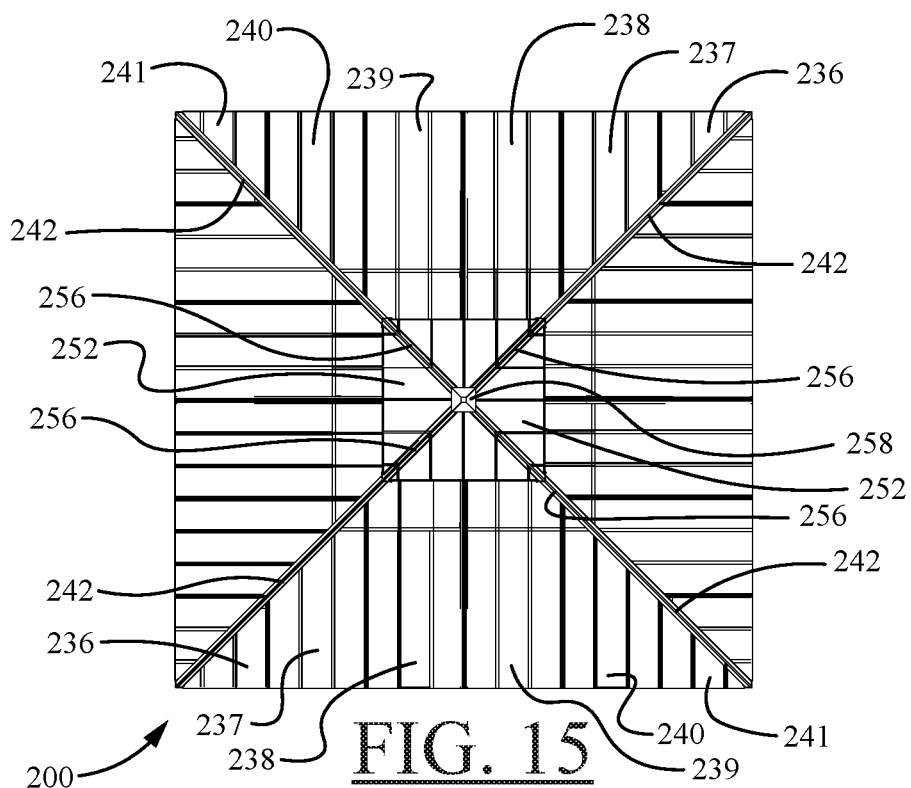
FIG. 15 is a top plan view of the hardtop gazebo of FIG. 10.

Turning to FIGS. 10 and 16-18, the roof structure and other features of the hardtop gazebo 200 will now be described. As best shown in FIGS. 10 and 18, the large peripheral roof portion formed by the large roof panels 236, 237, 238, 239, 240, 241 covers a majority of the roof framing system, while the small central roof portion formed by the four (4) triangular-shaped roof panels 252 covers the roof vent framing members. As shown in the typical detail of FIG. 26, the large roof panels 236, 237 fit together in an overlapping configuration (i.e., the ribs of the large roof panels 236, 237 interlock with one another to form a continuous roof structure). The large roof panels 236, 237, 238, 239, 240, 241 are secured to the roof beam members 224, 226 at the outer periphery of the large roof structure using large roof ribbed strips 220 (see FIG. 18). Similarly, the small roof panels 252 are secured to the peripheral roof beam members 248 at the outer periphery of the small roof structure using small roof ribbed strips 222 (see FIG. 18). Together the large roof panels 236, 237, 238, 239, 240, 241 and the small roof panels 252 form the roof of the hardtop gazebo 200. To seal the seams between the adjacent large roof panels 236, 237, 238, 239, 240, 241, roof edge sealing strips 242 are used. Similarly, to seal the seams between the adjacent small roof panels 252, roof edge sealing strips 256 are used. In FIGS. 10, 15, and 18, it can be seen that a small roof cover 258 is provided at the central peak of the small central roof portion to seal the opening at the central peak. For example, the small roof cover 258 may be attached to the central connecting member 254 by a suitable fastener (e.g., by a bolt). In FIG. 18, it can be seen that the underside of the central connecting member 254 is provided with a hook member 260 attached thereto (e.g., the end portion of the hook member 260 may be provided with a plurality of external threads that matingly engage with a plurality of internal threads on the central connecting member 254). As an example, the hook member 260 may be used for holding a hanging plant or a light inside the hardtop gazebo 200.

As shown in FIGS. 10-14 and 17-19, in the second illustrative embodiment, the corner support members 202 and the diagonal support members 208, 210 are provided with a wood grain pattern coating thereon so as to emulate the appearance of wood. To apply the wood grain pattern coating to the corner support members 202 and the diagonal support members 208, 210, an innovative a heat transfer film printing process is used. The heat transfer film printing process used to apply the wood grain pattern coating will be described hereinafter.

In the first primary step of the illustrative heat transfer film printing process, a primer coat is applied to outer surfaces of components of the hardtop gazebo 200 (e.g., to the outer surfaces of the corner support members 202 and the diagonal support members 208, 210, which are formed from aluminum). In the illustrative embodiment, the primer coat is applied to the components 202, 208, 210 of the hardtop gazebo 200 using an electrostatic spray gun. Also, in the illustrative embodiment, the primer coat is applied to the components 202, 208, 210 of the hardtop gazebo 200 so as to have a film thickness between approximately 50 microns and approximately 80 microns. Then, in the illustrative embodiment, prior to applying the heat transfer paper to the primed outer surface of the components 202, 208, 210 of the hardtop gazebo 200, the primed outer surfaces of the components 202, 208, 210 of the hardtop gazebo 200 are heated to a temperature of approximately 200 degrees Celsius for a time duration of approximately 30 minutes so as to cure the primed outer surfaces of the components 202, 208, 210 of the hardtop gazebo 200. After the heating of the components 202, 208, 210, the components 202, 208, 210 of the hardtop gazebo 200 are allowed to cool prior to applying the heat transfer paper to the primed outer surfaces of the components 202, 208, 210. In the second primary step of the heat transfer film printing process, a heat transfer paper with a print pattern is applied to the primed outer surfaces of the components 202, 208, 210 of the hardtop gazebo 200. In the illustrative embodiment, the print pattern of the heat transfer paper comprises a wood grain pattern so as to give components 202, 208, 210 of the hardtop gazebo 200 an appearance of being formed from wood. Also, in the illustrative embodiment, the heat transfer paper comprises a thin paper substrate that is coated with wax and color pigments. In the illustrative heat transfer printing process, the heat transfer paper is laid with its print pattern surface onto the primed outer surfaces of the components 202, 208, 210 of the hardtop gazebo 200. In the third primary step of the heat transfer film printing process, the components 202, 208, 210 of the hardtop gazebo 200 with the heat transfer paper applied thereto are inserted into plastic sleeves having open ends. In the fourth primary step of the heat transfer film printing process, a vacuum source (e.g., a vacuum pump) is attached to the open ends of the plastic sleeves via a hose. In the fifth primary step of the heat transfer film printing process, the air is extracted from inside the plastic sleeves using the vacuum source so as to cause the plastic sleeves to shrink and wrap tightly around the components 202, 208, 210 of the hardtop gazebo 200 with the heat transfer paper applied thereto. In the sixth primary step of the heat transfer film printing process, the components 202, 208, 210 of the hardtop gazebo 200 with the heat transfer paper and the vacuum wrapped plastic sleeves are placed into an oven. In the seven primary step of the heat transfer film printing process, the components 202, 208, 210 of the hardtop gazebo 200 with the heat transfer paper and the vacuum wrapped sleeves are heated inside the oven within a predetermined temperature range for a predetermined time duration. In the illustrative embodiment, the predetermined temperature range for heating the components 202, 208, 210 of the hardtop gazebo 200 with the heat transfer paper and the vacuum wrapped sleeves inside the oven is between approximately 180 degrees Celsius and approximately 200 degrees Celsius. Also, in the illustrative embodiment, the predetermined time duration for heating the components 202, 208, 210 of the hardtop gazebo 200 with the heat transfer paper and the vacuum wrapped sleeves inside the oven is between approximately 15 minutes and approximately 20 minutes. The heating temperature and heating time duration affects the adhesion of the paper prints onto the primed surfaces of the components 202, 208, 210, as well as the color of the prints. In the eighth primary step of the heat transfer film printing process, the components 202, 208, 210 of the hardtop gazebo 200 with the heat transfer paper and the vacuum wrapped sleeves are removed from the oven so as to allow the components 202, 208, 210 of the hardtop gazebo 200 with the heat transfer paper and the vacuum wrapped sleeves to cool. In the ninth and final step of the heat transfer film printing process, the vacuum wrapped sleeves are removed from the coated components 202, 208, 210 of the hardtop gazebo 200, thereby resulting in a finished product.

It is readily apparent that the aforedescribed hardtop gazebo 100, 200 offers numerous advantages. First of all, the hardtop gazebo 100, 200 has enhanced functionality, such as air venting from the interior of the hardtop gazebo 100, 200. In addition, various components (e.g., corner support members 202 and the diagonal support members 208, 210) of the hardtop gazebo 100, 200 may be made using an innovative heat transfer film process so the components may be provided with an exterior finish that is not limited by the base substrate used for the one or more components of the hardtop gazebo 100, 200 (i.e., even though the corner support members 202 and the diagonal support members 208, 210 are made from metal, the coating applied by the heat transfer film process enables them to have the appearance of wood).

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A process used in making a hardtop gazebo, the process comprising the steps of:
    applying a primer coat to an outer surface of a component of the hardtop gazebo;
    applying a heat transfer paper with a print pattern to the primed outer surface of the component of the hardtop gazebo;
    inserting the component of the hardtop gazebo with the heat transfer paper applied thereto into a sleeve having an open end;
    attaching a vacuum source to the open end of the sleeve;
    extracting the air from inside the sleeve using the vacuum source so as to cause the sleeve to shrink and wrap tightly around the component of the hardtop gazebo with the heat transfer paper applied thereto;
    placing the component of the hardtop gazebo with the heat transfer paper and the vacuum wrapped sleeve into an oven;
    heating the component of the hardtop gazebo with the heat transfer paper and the vacuum wrapped sleeve inside the oven within a predetermined temperature range for a predetermined time duration;
    removing the component of the hardtop gazebo with the heat transfer paper and the vacuum wrapped sleeve from the oven so as to allow the component of the hardtop gazebo with the heat transfer paper and the vacuum wrapped sleeve to cool; and
    removing the vacuum wrapped sleeve from the component of the hardtop gazebo with the heat transfer paper, thereby resulting in a finished product.

2. The process according to claim 1, wherein the component of the hardtop gazebo to which the primer coat is applied comprises a corner post member, and wherein the print pattern of the heat transfer paper comprises a wood grain pattern.

3. The process according to claim 1, wherein the primer coat is applied to the component of the hardtop gazebo using an electrostatic spray gun.

4. The process according to claim 1, wherein the primer coat is applied to the component of the hardtop gazebo so as to have a film thickness between approximately 50 microns and approximately 80 microns.

5. The process according to claim 1, further comprising the steps of:
    prior to applying the heat transfer paper to the primed outer surface of the component of the hardtop gazebo, heating the primed outer surface of the component of the hardtop gazebo to a temperature of approximately 200 degrees Celsius for a time duration of approximately 30 minutes so as to cure the primed outer surface of the component of the hardtop gazebo; and
    allowing the component of the hardtop gazebo to cool prior to the step of applying the heat transfer paper to the primed outer surface of the component of the hardtop gazebo.

6. The process according to claim 1, wherein the heat transfer paper comprises a paper substrate that is coated with wax and color pigments.

7. The process according to claim 1, wherein the predetermined temperature range for heating the component of the hardtop gazebo with the heat transfer paper and the vacuum wrapped sleeve inside the oven is between approximately 180 degrees Celsius and approximately 200 degrees Celsius.

8. The process according to claim 1, wherein the predetermined time duration for heating the component of the hardtop gazebo with the heat transfer paper and the vacuum wrapped sleeve inside the oven is between approximately 15 minutes and approximately 20 minutes.

\* \* \* \* \*